(12) United States Patent
Nagakari et al.

(10) Patent No.: US 12,280,491 B2
(45) Date of Patent: Apr. 22, 2025

(54) CONTROL DEVICE, CONTROL METHOD, AND CONTROL PROGRAM

(71) Applicant: SONY GROUP CORPORATION, Tokyo (JP)

(72) Inventors: Satoko Nagakari, Chiba (JP); Tetsuya Narita, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 588 days.

(21) Appl. No.: 17/624,656

(22) PCT Filed: Jul. 10, 2020

(86) PCT No.: PCT/JP2020/027155
§ 371 (c)(1),
(2) Date: Jan. 4, 2022

(87) PCT Pub. No.: WO2021/015025
PCT Pub. Date: Jan. 28, 2021

(65) Prior Publication Data

US 2022/0274262 A1  Sep. 1, 2022

(30) Foreign Application Priority Data

Jul. 23, 2019 (JP) ................. 2019-135684

(51) Int. Cl.
*B25J 13/08* (2006.01)
*B25J 9/16* (2006.01)
*B25J 15/08* (2006.01)

(52) U.S. Cl.
CPC .......... *B25J 13/083* (2013.01); *B25J 9/1612* (2013.01); *B25J 13/084* (2013.01); *B25J 15/08* (2013.01)

(58) Field of Classification Search
CPC ...... B25J 13/083; B25J 9/1612; B25J 13/084; B25J 15/08; B25J 9/1633; B25J 9/16;
(Continued)

(56) References Cited

U.S. PATENT DOCUMENTS

| | | | |
|---|---|---|---|
| 2009/0031825 A1 | 2/2009 | Kishida | |
| 2011/0252896 A1* | 10/2011 | Kishida | ............... B25J 15/0009 |
| | | | 73/862.621 |
| 2012/0253516 A1* | 10/2012 | Iida | ........................ B25J 13/082 |
| | | | 700/258 |

FOREIGN PATENT DOCUMENTS

| | | |
|---|---|---|
| CN | 1757490 A | 4/2006 |
| CN | 108942917 A | 12/2018 |

(Continued)

OTHER PUBLICATIONS

English Translation of JP2005219161A; Okamoto, Shusaku; Robot Grip Control Device and Robot Grip Control System (Year: 2005).*

*Primary Examiner* — Adam R Mott
*Assistant Examiner* — Joseph Anthony Trias
(74) *Attorney, Agent, or Firm* — Paratus Law Group, PLLC

(57) ABSTRACT

Provided are a control device, a control method, and a control program capable of realizing natural interaction between a human and a robot like between humans. A control device according to an embodiment includes a slip detection unit (15, 104) and a control unit (10). The slip detection unit detects a slip of a target object gripped by a grip portion. The control unit controls a gripping force with which the grip portion grips the target object based on the slip detected by the slip detection unit. The control unit estimates an external force applied to the target object gripped by the grip portion based on the slip detected by the slip detection unit, and controls the gripping force based on the estimated external force.

14 Claims, 12 Drawing Sheets

(58) Field of Classification Search
CPC .......... B25J 9/161; G05B 2219/39505; G05B 2219/39507; G05B 2219/39528; G05B 2219/39532; G05B 2219/39547
USPC ........................................................ 700/253
See application file for complete search history.

(56) References Cited

FOREIGN PATENT DOCUMENTS

| | | | |
|---|---|---|---|
| JP | 2004-167674 A | | 6/2004 |
| JP | 2005219161 A | * | 8/2005 |
| JP | 2009-034742 A | | 2/2009 |
| JP | 2009-066714 A | | 4/2009 |
| JP | 4600445 B2 | | 12/2010 |
| JP | 4683073 B2 | | 5/2011 |
| JP | 2019-018253 A | | 2/2019 |
| WO | WO-2006030570 A1 | | 3/2006 |

* cited by examiner

CONTROL DEVICE, CONTROL METHOD, AND CONTROL PROGRAM

CROSS REFERENCE TO PRIOR APPLICATION

This application is a National Stage Patent Application of PCT International Patent Application No. PCT/JP2020/027155 (filed on Jul. 10, 2020) under 35 U.S.C. § 371, which claims priority to Japanese Patent Application No. 2019-135684 (filed on Jul. 23, 2019), which are all hereby incorporated by reference in their entirety.

FIELD

The present disclosure relates to a control device, a control method, and a control program.

BACKGROUND

In order for a robot to coexist with a human, it is essential to realize interaction with a human, and for this purpose, a function that can be realized in hardware is required in addition to a function that can be realized by software, such as human recognition and voice interaction. As one of the hardware interaction functions, there is a function of exchanging a gripped object with a person. As a robot control technique, it is essential not only to increase a gripping force in order to receive an object from others but also to decrease the gripping force in order to pass the gripped object to another.

CITATION LIST

Patent Literature

Patent Literature 1: JP 4683073 B2
Patent Literature 2: JP 4600445 B2

SUMMARY

Technical Problem

However, conventionally, while many techniques for increasing the gripping force at the time of transferring an object have been studied, techniques for reducing the gripping force have not been sufficiently studied. Therefore, it has been difficult to realize natural interaction between a human and a robot like between humans.

An object of the present disclosure is to provide a control device, a control method, and a control program capable of realizing natural interaction between a human and a robot like between humans.

Solution to Problem

For solving the problem described above, a control device according to one aspect of the present disclosure has a slip detection unit that detects a slip of a target object gripped by a grip portion; and a control unit that controls a gripping force with which the grip portion grips the target object based on the slip detected by the slip detection unit, wherein the control unit estimates an external force applied to the target object gripped by the grip portion based on the slip detected by the slip detection unit, and controls the gripping force based on the estimated external force.

DESCRIPTION OF EMBODIMENTS

Figure 1:
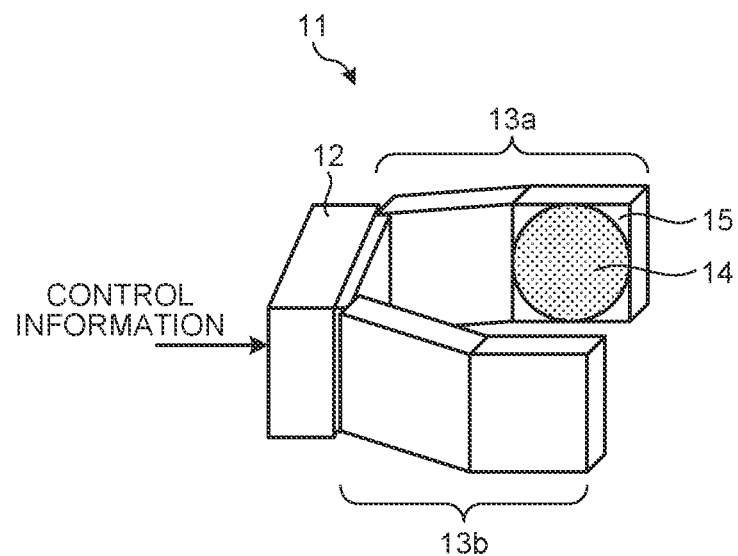
FIG. 1 is a perspective view schematically illustrating an appearance of a robot hand applicable to an embodiment.

Hereinafter, an embodiment of the present disclosure will be described in detail with reference to the drawings. Note that, in the following embodiment, the same parts are denoted by the same reference numerals, and redundant description will be omitted.

Hereinafter, the embodiment of the present disclosure will be described in the following order.

1. Summary of embodiment
   1-1. Example of robot hand applicable to embodiment
   1-2. Existing technology 2. More specific description of transfer according to embodiment
  2-1. Definition of each portion
  2-2. External force estimation method using slip sense
  2-3. Configuration of robot hand according to embodiment
  2-4. Control of transfer operation according to embodiment
  2-5. Operation in arbitrary transfer direction according to embodiment
  2-6. Application example of control according to embodiment
3. First modification of embodiment
4. Second modification of embodiment
5. Third modification of embodiment
6. Other configurations 1. Summary of Embodiment An embodiment according to the present disclosure relates to control of a robot hand capable of gripping an object, and more particularly to a technique of appropriately controlling a gripping force in a case where a person passes an object to the robot hand and in a case where a person receives an object from the robot hand.

1-1. Example of Robot Hand Applicable to Embodiment

FIG. 1 is a perspective view schematically illustrating an appearance of a robot hand applicable to an embodiment. In FIG. 1, a robot hand 11 includes two fingers of finger portions 13a and 13b for the sake of explanation, and the finger portions 13a and 13b are connected to a wrist portion 12 and are arranged to face each other. That is, the finger portions 13a and 13b are held with the wrist portion 12 as a holding portion. In addition, the finger portions 13a and 13b are provided with a parallel link mechanism, and are driven to open and close such that the links on a distal end side (an opposite side to the wrist portion 12) of the finger portions 13a and 13b maintain a parallel relationship.

Hereinafter, the links on the distal end side of the finger portions 13a and 13b are referred to as fingertip portions, respectively. Further, the finger portions 13a and 13b are driven to open and close by an actuator according to a control signal supplied from the outside, for example.

In FIG. 1, in the robot hand 11, a tactile sensor 15 is provided at a fingertip portion of the finger portion 13a, and an elastic body 14 is further provided for the tactile sensor 15. Elastic resin such as rubber is used for the elastic body 14, and it is deformed according to a force applied to a side facing a surface in contact with the tactile sensor 15. In the example of FIG. 1, the elastic body 14 has a hemispherical shape, but this is not limited to this example. For example, the elastic body 14 may have a plate shape, or a surface in contact with an object gripped by the robot hand 11 may be subjected to processing such as unevenness.

The tactile sensor 15 outputs a detection signal corresponding to an applied pressure. In the embodiment, a pressure distribution sensor capable of detecting a pressure distribution on a two-dimensional surface is applied as the tactile sensor 15. The tactile sensor 15 can detect a force applied to the elastic body 14, and a displacement amount and a displacement direction in a two-dimensional plane of deformation generated according to the force.

The elastic body 14 and the tactile sensor 15 are similarly provided on the fingertip portion of the finger portion 13b.

The robot hand 11 can sandwich an object of a target object with the respective fingertip portions of the finger portions 13a and 13b, and grip the object using a frictional force. In other words, the fingertip portions including the elastic body 14 (and the tactile sensor 15) can be said to be a grip portion that grips the object according to the movement of the finger portions 13a and 13b.

Furthermore, for example, an acceleration sensor (not illustrated) that detects the acceleration of the robot hand 11 is provided on the wrist portion 12. For example, an acceleration sensor capable of detecting acceleration in each of the directions of three axes is provided on the wrist portion 12. The magnitude of gravity applied to the robot hand 11 and the attitude of the robot hand 11 can be detected based on a sensor output of the acceleration sensor. Here, for example, when an axis whose direction coincides with a gravity direction is defined in the robot hand 11, the attitude includes an inclination of the axis with respect to the gravity direction and rotation with respect to the axis in the gravity direction.

The wrist portion 12 is further provided with a force sensor (not illustrated) that detects a force applied to the entire robot hand 11. The force sensor can be configured by, for example, an acceleration sensor. In the embodiment, this force sensor can be omitted.

1-2. Existing Technology

Here, a transfer of an object between a robot hand and a person according to an existing technology will be described. According to an existing technology, a method has been proposed in which, in a robot hand, a force sensor provided at a wrist portion is used, and finger portions are released at the moment when the force sensor detects a change amount equal to or more than a predetermined threshold (for example, Patent Literature 1 and Patent Literature 2). However, in order to realize natural interaction between a person and the robot hand by this method, it is considered that there are three major problems.

A first problem is that it is difficult to detect a minute change in external force related to a fingertip since a force sensor provided in the wrist portion is used. That is, in order to realize a natural transfer of an object, it is necessary to be able to detect a minute change in external force. The second problem is that it is difficult to distinguish whether a force detected by the force sensor is an external force related to the robot hand or an external force related to an object gripped by the robot hand. In the force sensor provided on the wrist, there is a possibility that the external force related to the robot hand is erroneously detected as the external force related to the object, and it is difficult to realize the transfer of the object robust to the external force. A third problem is two-state control based on a certain threshold. In the two-state control based on the threshold, the robot hand keeps gripping an object while maintaining a constant gripping force until a person applies a certain magnitude of force, and releases the force at once with a certain threshold as a boundary. Therefore, it is expected that the person cannot predict the motion of the robot hand and loses his/her balance.

As described above, in the existing method, it is difficult to realize a hardware interaction function between the robot hand and the person.

In the present disclosure, when the grip portion of the robot hand grips the object, the slip of the grip portion with respect to the object is detected, and a gripping force with which the grip portion grips the object is controlled according to the detected slip. As described above, by controlling the gripping force when the grip portion transfers the object according to the slip of the object in the grip portion, it is possible to perform an interaction between the person and the robot hand as if they were persons.

2. More Specific Description of Transfer According to Embodiment

2-1. Definition of Each Portion

Figure 2:
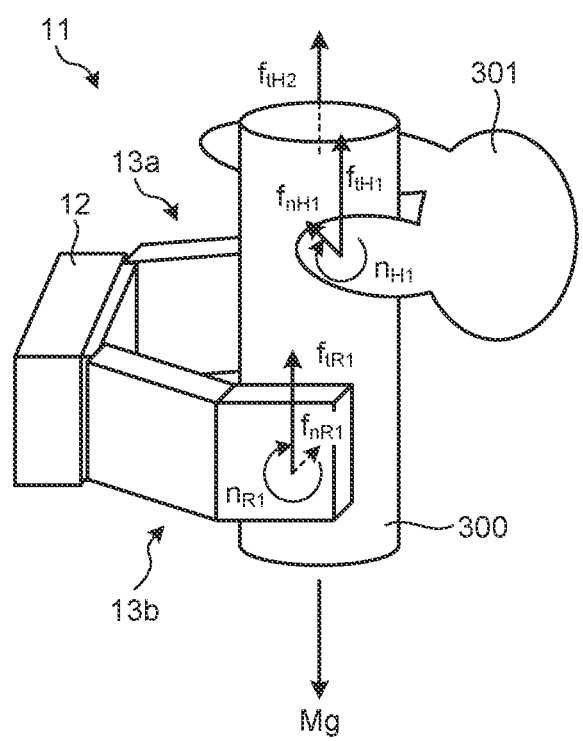
FIG. 2 is a diagram schematically illustrating forces generated in each portion when a human force acts on an object gripped by the robot hand.

Next, a transfer of the object between the robot hand and the person according to the embodiment will be specifically described. FIG. 2 is a diagram schematically illustrating forces generated in each portion when a human force acts on an object 300 gripped by the robot hand 11. In FIG. 2, the robot hand 11 is in such an attitude that the finger portions 13a and 13b are opened and closed along a plane horizontal to a direction of gravity Mg, and the object 300 as a gripping target object is gripped by each fingertip portion of the finger portions 13a and 13b. The person pulls up the object 300 in a direction opposite to the gravity Mg with a hand 301, for example, to receive the object from the robot hand 11.

Here, each force acting on the object 300 by the fingertip portion (elastic body 14) of the finger portion 13b is defined. By gripping the object 300 with the fingertip portion, each force of a normal force $f_{nRi}$, a shearing force $f_{tRi}$, and a moment $n_{Ri}$ acts on the object 300.

The normal force $f_{nR1}$ is a force acting on the object 300 in a direction in which each fingertip portion of the finger portions 13a and 13b sandwiches the object 300. This normal force $f_{nR1}$ can be considered as a gripping force with which the robot hand 11 grips the object 300. The shearing force $f_{nR1}$ is a force acting in a direction perpendicular to the normal force $f_{nR1}$. In the example of FIG. 2, the shearing force $f_{tRi}$ is a force acting on the object 300 in a vertical direction (the direction of the gravity Mg). The moment $n_{Ri}$ is a force acting in a rotational direction on a plane perpendicular to a direction of the normal force $f_{nR1}$.

Note that, in the normal force $f_{nR1}$, the shearing force $f_{tRi}$, and the moment $n_{Ri}$, a subscript "i" indicates each finger. That is, in the example of FIG. 2, each force of the normal force $f_{nR1}$, the shearing force $f_{nR1}$, and the moment $n_{Ri}$ acts on the object 300 by the fingertip portion of the finger portion 13b. Furthermore, each force of the normal force $f_{nR1}$, the shearing force $f_{tR2}$, and the moment $n_{R2}$ acts on the object 300 by the fingertip portion of the finger portion 13a.

Moreover, when the hand 301 grips the object 300, each of a normal force $f_{nRi}$, a shearing force $f_{tHi}$, and a moment $n_{Hi}$ acts on the object 300. The normal force $f_{nRi}$ is a force acting on the object 300 in a direction in which each fingertip of the hand 301, for example, a thumb and each finger other than the thumb sandwich the object 300. The shearing force $f_{tR1}$ is a force acting on the object 300 in a direction perpendicular to the normal force $f_{nHi}$. In the example of FIG. 2, the shearing force $f_{tHi}$ is a force acting on the object 300 in the vertical direction (the direction of the gravity Mg). The moment $n_{Hi}$ is a force acting on the object 300 in a rotational direction on a plane perpendicular to the normal force $f_{nHi}$.

As described above, the subscript "i" indicates each finger. That is, in the example of FIG. 2, the respective forces of the normal force (gripping force) $f_{nH1}$, the shearing force $f_{tH1}$, and the moment $n_{H1}$ act on the object 300 by the first fingertip (for example, the thumb) of the hand 301. Furthermore, the respective forces of the normal force $f_{nH2}$, the shearing force $f_{tH2}$, and the moment $n_{H2}$ act on the object 300 by the second fingertip (for example, each finger other than the thumb) of the hand 301.

Here, a friction coefficient between the robot hand 11 (elastic body 14) and the object 300 is defined as a friction coefficient $\mu_R$, and a friction coefficient between the finger of the hand 301 and the object 300 is defined as a friction coefficient $\mu_H$. In this case, in order for the object 300 to be gripped by the hand 301 and the robot hand 11 without slipping, it is assumed that a relationship of the following formulas (1) and (2) is satisfied according to Ammonton=Coulomb's law of friction.

$$\mu_R f_{nRi} \geq f_{tRi} \quad (1)$$

$$\mu_H f_{nHi} \geq f_{tHi} \quad (2)$$

In the embodiment, in a state where the formulas (1) and (2) are satisfied, the external force and the external moment (moment generated by the external force) applied to the object 300 are estimated using an initial slip detected by the tactile sensor 15 provided in each of the finger portions 13a and 13b. Then, the gripping force of the robot hand 11 is controlled such that a balance between the estimated external force and the force (gripping force) generated by the robot hand 11, and a balance between the estimated external moment and the moment generated by the robot hand 11 are always maintained.

A formula (3) represents a balance between the estimated external force and the force generated by the robot hand 11. A formula (4) represents a balance between the estimated external moment and the moment generated by the robot hand 11. That is, the formula (3) represents the balance in the position direction, and the formula (4) represents the balance in the rotational direction. In the formulas (3) and (4), a value "i" indicates each finger as described above. A value "N" indicates the number of fingers.

$$\sum_{i=1}^{N} f_{Ri} + \sum_{i=1}^{N} f_{Hi} + Mg = 0 \quad (3)$$

$$\sum_{i=1}^{N} n_{Ri} + \sum_{i=1}^{N} n_{Hi} + lg \times Mg = 0 \quad (4)$$

2-2. External Force Estimation Method Using Slip Sense

Figure 3:
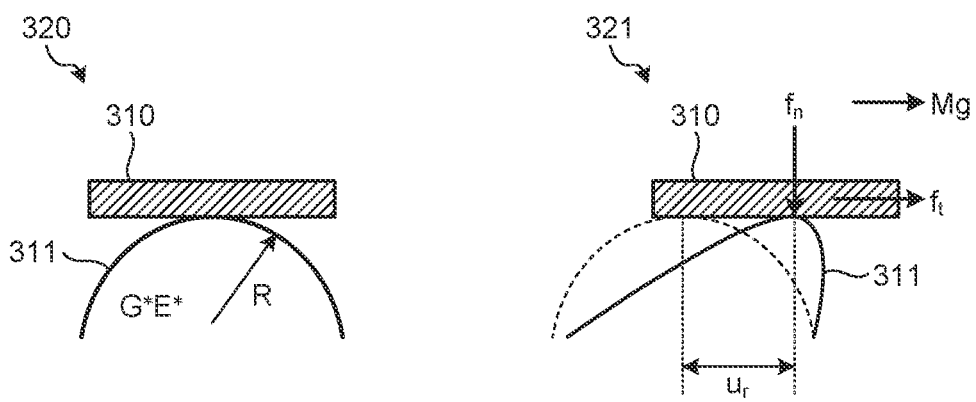
FIG. 3 is a diagram illustrating a model for explaining a Hertz contact theory.

Next, a method for estimating an external force using a slip sense according to an embodiment will be described. FIG. 3 is a diagram illustrating a model for describing a Hertz contact theory.

In charts 320 and 321 of FIG. 3, a horizontal right direction in the drawing is a direction of gravity Mg, an elastic sphere 311 corresponds to the elastic body 14 in FIGS. 1 and 2, and a rigid flat plate 310 corresponds to the object 300 in FIG. 2. For example, the elastic sphere 311 is a hemisphere in which a surface facing the rigid flat plate 310 corresponding to the object 300 in FIG. 2 is joined to the tactile sensor 15. The chart 320 of FIG. 3 schematically illustrates a state in which the rigid flat plate 310 is in contact with the elastic sphere 311 with a direction parallel to the direction of the gravity Mg as a tangent.

The chart 321 of FIG. 3 schematically illustrates a state in which a normal force $f_n$ is applied to the rigid flat plate 310 in a direction perpendicular to the tangent, and a shearing force $f_t$ is applied in a tangential direction. The shearing force $f_t$ is a force obtained by combining the gravity Mg and the shearing force $f_{tH}$ by the hand 301, and is expressed as $f_t = Mg + f_{tH}$. Note that, in the chart 321, it is assumed that the shearing force $f_{tH}$ by the hand 301 is 0.

In the chart 321 of FIG. 3, the elastic sphere 311 is deformed by the shearing force $f_t$ according to a direction of the shearing force $f_t$. As a result, a position of a point at which the rigid flat plate 310 and the elastic sphere 311 are in contact moves with respect to a position in a left diagram of FIG. 3, and a displacement amount $u_r$ is generated at the position of the point. This displacement amount $u_r$ occurs, for example, at the fingertip portions of the finger portions 13a and 13b of the robot hand 11, and is hereinafter referred to as a fingertip shear displacement amount $u_r$.

Although details will be described later, in the embodiment, the fingertip shear displacement amount $u_r$ is obtained on the basis of a detection output by the tactile sensor 15. That is, the tactile sensor 15 is used as a slip sense sensor that detects (senses) a slip between the elastic sphere 311 and the rigid flat plate 310 due to the shearing force $f_t$.

This fingertip shear displacement amount $u_L$ indicates displacement in the position direction, and is expressed by the following formula (5) according to the Hertz contact theory. In the formula (5), a radius of curvature of the elastic sphere 311 is denoted by R, a composite transverse elastic coefficient of the elastic sphere 311 and the rigid flat plate 310 is denoted by G*, and a composite longitudinal elastic coefficient of the elastic sphere 311 and the rigid flat plate 310 is denoted by E* (see the left diagram in FIG. 3).

$$u_r = \frac{f_t}{G^* \pi} \left( \frac{3Rf_n}{4E^*} \right)^{-\frac{2}{3}} \quad (5)$$

Here, the shearing force $f_t$ is unknown. Furthermore, the normal force $f_n$ is known, for example, in a control unit that controls the gripping force of the robot hand 11, that is, the normal force $f_n$. On the other hand, the radius of curvature R, the composite transverse elastic coefficient G*, and the composite longitudinal elastic coefficient E* are physical information of the elastic sphere 311 and the rigid flat plate 310, and are constants. Therefore, it can be understood that the fingertip shear displacement amount $u_r$ depends on the normal force $f_n$ and the shearing force $f_t$. Thus, it is possible to estimate the shearing force $f_t$ by observing the fingertip shear displacement amount $u_r$.

A fingertip rotational displacement amount $u_{theta}$ indicating displacement in the rotational direction is expressed by the following formula (6) based on the same idea as the fingertip shear displacement amount $u_r$ described above. Also in this case, as described above, a moment n can be estimated by observing the fingertip rotational displacement amount $u_{theta}$. Similarly to the fingertip shear displacement amount $u_r$ described above, the fingertip rotational displacement amount $u_{theta}$ can also be obtained on the basis of a detection result of the tactile sensor 15 as a slip sense sensor.

$$u_{theta} = \frac{n}{G^* \pi R^{\frac{5}{3}}} \left( \frac{3 f_n}{4E^*} \right)^{-\frac{2}{3}} \quad (6)$$

Next, with reference to FIG. 2, a case where an external force $\Delta f_t$ acts on the object 300 while the robot hand 11 grips the object 300 with the normal force (gripping force) $f_{nR}$ will be considered. This external force $\Delta f_t$ is, for example, a shearing force $\Delta f_{tH}$ by the hand 301.

Figure 4:
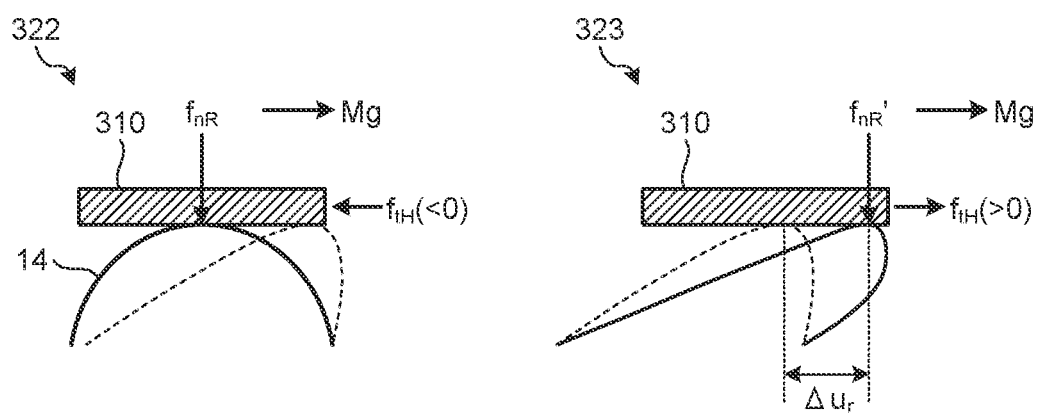
FIG. 4 is a diagram illustrating an example in which a case where an external force $\Delta f_t$ acts on the object is applied to the model for explaining the Hertz contact theory.

FIG. 4 is a diagram illustrating an example in which a case where the external force $\Delta f_t$ acts on the object 300 is applied to the model described with reference to FIG. 3. A chart 322 in FIG. 4 schematically illustrates a state in which the external force $\Delta f_t$, that is, the shearing force $f_{tH}$ acts on the rigid flat plate 310 in a direction opposite to the gravity Mg from the state illustrated in the chart 321 in FIG. 3 described above. In the example of FIG. 2, the state of the chart 322 of FIG. 4 corresponds to a state in which the hand 301, for example, pulls up the object 300 gripped by the robot hand 11. In this case, the shearing force $f_{tH}$ has a negative value.

The elastic sphere 311 is in a state in which the deformation is restored according to the shearing force $f_{tH}$ (<0) with respect to the state illustrated in the chart 321 in FIG. 3. That is, a fingertip shear displacement amount $u_r$ in a left diagram of FIG. 4 is a value obtained by adding a fingertip shear displacement amount $\Delta u_r$ having a negative value to the fingertip shear displacement amount $u_r$ in the state illustrated in the chart 321 of FIG. 3. When the shearing force $f_{tH}$ (<0)+Mg=0, the elastic sphere 311 is in the state illustrated in the chart 322 of FIG. 4, and the fingertip shear displacement amount $u_r$=0.

A chart 323 in FIG. 4 schematically illustrates a state in which the shearing force $f_{tH}$ acts on the rigid flat plate 310 in the same direction as the gravity Mg from the state illustrated in the chart 321 of FIG. 3 described above. In the example of FIG. 2, the state illustrated in the chart 323 of FIG. 4 corresponds to a state in which the hand 301 pulls down the object 300 gripped by the robot hand 11, for example. In this case, the shearing force $f_{tH}$ has a positive value.

The elastic sphere 311 is further deformed according to the added shearing force $f_{tH}$ (>0) with respect to the state illustrated in the chart 321 of FIG. 3 (see the chart 323 of FIG. 4). In this case, a fingertip shear displacement amount $u_r$ in a right diagram of FIG. 4 is obtained by adding a fingertip shear displacement amount $\Delta u_r$ having a positive value according to the shearing force $f_{tH}$ to the fingertip shear displacement amount $u_r$ in the state illustrated in the chart 321 of FIG. 3.

In the embodiment, in the case illustrated in the charts 322 and 323 of FIG. 4, the fingertip shear displacement amount $\Delta u_r$ and the fingertip rotational displacement amount $\Delta u_{theta}$ are observed, and the external force $\Delta f_{tH}$ and the external moment $\Delta n_H$ applied to the object 300 are estimated using the above-described formulas (5) and (6). Then, on the basis of the estimated external force $\Delta f_{tH}$ and external moment $\Delta n_H$, the gripping force by the robot hand 11 is controlled so that the balance between each force and moment is always maintained.

Here, each of the fingertip shear displacement amount $\Delta u_r$ and the fingertip rotational displacement amount $\Delta u_{theta}$ corresponds to a change in the magnitude of slippage of the elastic sphere 311 with respect to the object 300 (for example, a change per unit time). In other words, each of the fingertip shear displacement amount $\Delta u_r$ and the fingertip rotational displacement amount $\Delta u_{theta}$ is a value indicating the degree of slippage of the elastic sphere 311 with respect to the object 300.

In the charts 321 to 323 illustrated in FIGS. 3 and 4, an absolute contact position moves while maintaining a relative positional relationship between the contact positions of the elastic sphere 311 and the rigid flat plate 310, which is a so-called initial slip state. The slip discussed in the present specification is the state of this initial slip.

2-3. Configuration of Robot Hand According to Embodiment

Figure 5:
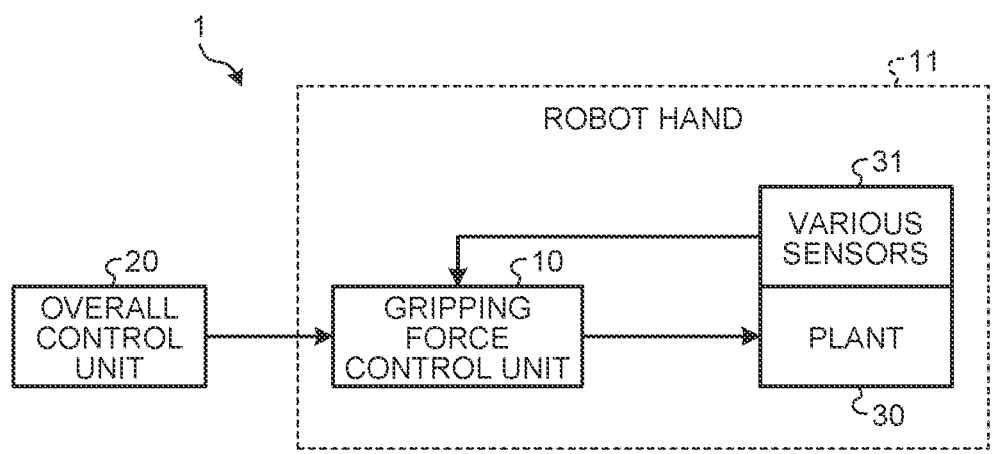
FIG. 5 is a block diagram schematically illustrating a configuration of a robot apparatus to which the robot hand according to the embodiment is applicable.

Next, the configuration of the robot hand 11 according to the embodiment will be described more specifically. FIG. 5 is a block diagram schematically illustrating a configuration of a robot apparatus to which the robot hand 11 according to the embodiment can be applied. In FIG. 5, a robot apparatus 1 includes the robot hand 11 and an overall control unit 20.

The overall control unit 20 includes, for example, a central processing unit (CPU), a read only memory (ROM), a random access memory (RAM), various interfaces, and the like, and controls the overall operation of the robot apparatus 1 using the RAM as a work memory according to a program stored in advance in the ROM. The interfaces transmit and receive signals between the overall control unit 20 and the robot hand 11, for example.

The robot hand 11 includes a gripping force control unit 10, a plant 30, and various sensors 31. The plant 30 includes, for example, an actuator used for a movable portion of the robot hand 11 and a drive circuit for driving the actuator, and executes an opening/closing operation, a gripping operation, and the like of the finger portions 13a and 13b according to a drive control signal.

The various sensors 31 include one or more sensors that detect a force acting on the plant 30. For example, the various sensors 31 include the tactile sensor 15 described above, an acceleration sensor (described later) that detects acceleration of the robot hand 11, and the like.

The gripping force control unit 10 generates a drive control signal for driving the plant 30 on the basis of control information supplied from the overall control unit 20 and sensor information supplied from the various sensors 31.

Figure 6:
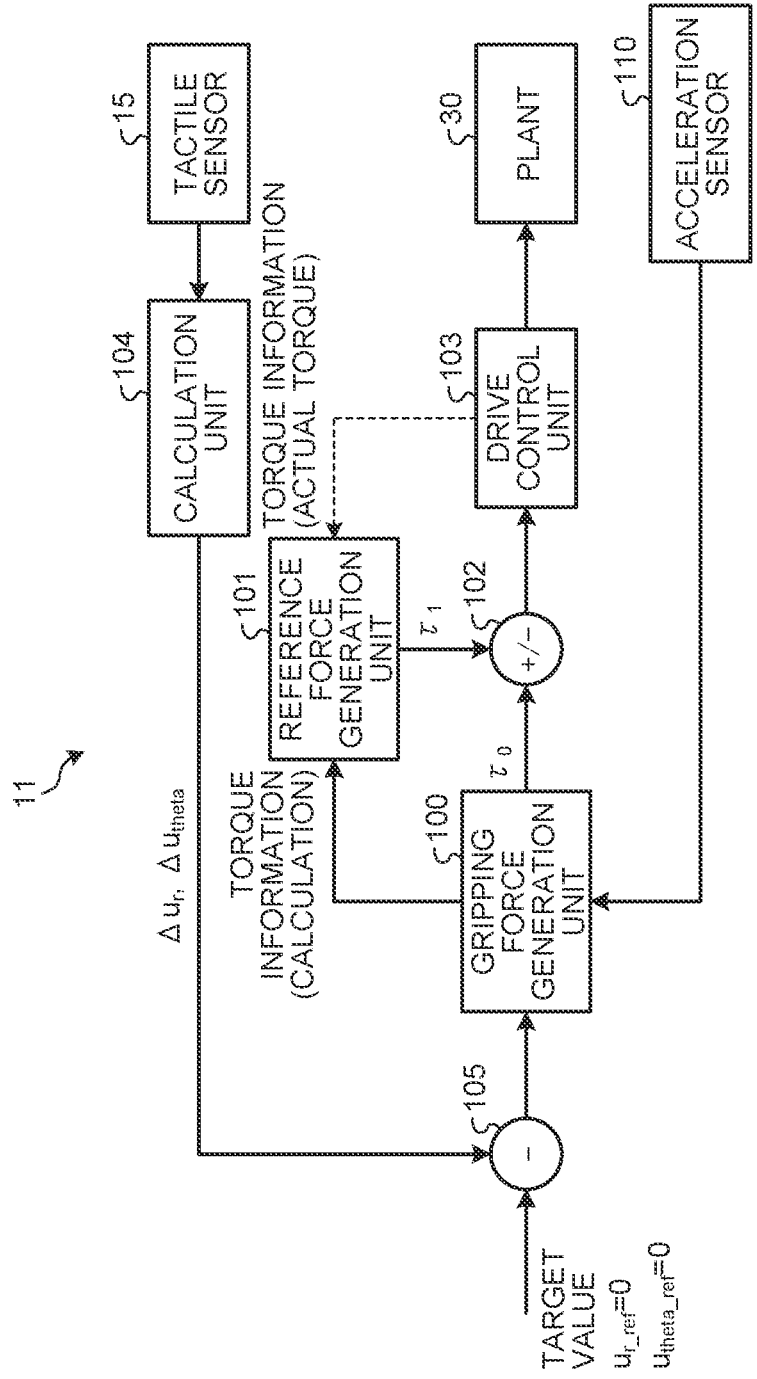
FIG. 6 is a functional block diagram of an example for explaining a function of the robot hand according to the embodiment.

FIG. 6 is a functional block diagram of an example for explaining a function of the robot hand 11 according to the embodiment. In FIG. 6, the robot hand 11 includes the tactile sensor 15, the plant 30, a gripping force generation unit 100, a reference force generation unit 101, an adder-subtractor 102, a drive control unit 103, a calculation unit 104, a subtractor 105, and an acceleration sensor 110.

The gripping force control unit 10 described with reference to FIG. 5 includes, for example, the gripping force generation unit 100, the reference force generation unit 101, the adder-subtractor 102, the drive control unit 103, the calculation unit 104, and the subtractor 105. The gripping force generation unit 100, the reference force generation unit 101, the adder-subtractor 102, the drive control unit 103, the calculation unit 104, and the subtractor 105 are implemented by a program that operates on a CPU (described later) included in the gripping force control unit 10. Not limited to this, part or all of the gripping force generation unit 100, the reference force generation unit 101, the adder-subtractor 102, the drive control unit 103, the calculation unit 104, and the subtractor 105 may be configured by a hardware circuit that operates in cooperation with each other.

Furthermore, the various sensors 31 include, for example, the tactile sensor 15 and the acceleration sensor 110. The acceleration sensor 110 is, for example, a sensor capable of detecting acceleration in each direction of three axes, and can detect the attitude of the robot hand 11 and the gravity Mg.

The calculation unit 104 calculates a fingertip shear displacement amount $u_r$ and a fingertip rotational displacement amount $u_{theta}$ based on the detection output of the tactile sensor 15. That is, the calculation unit 104 and the tactile sensor 15 constitute a slip detection unit that detects slip with respect to the object 300 gripped by the robot hand 11.

Here, as the tactile sensor 15, for example, a pressure distribution sensor capable of detecting a pressure distribution can be applied. For example, in the tactile sensor 15, a plurality of pressure sensors each detecting a pressure are arranged in a matrix, and information indicating a pressure detected by each pressure sensor can be output in association with coordinate information in the matrix.

The calculation unit 104 calculates a movement amount of the center of pressure (CoP) based on a detection output supplied from the tactile sensor 15. The center of pressure CoP can be generally calculated by the following formula (7). In the formula (7), a variable $x_i$ represents a position (x coordinate) of the pressure sensor in an X direction, a variable $p(x_i)$ represents a pressure at the position $x_i$, and a variable N represents the number of distributions.

$$X_{cop} = \frac{\sum_{0}^{N-1} \{p(x_i) \cdot x_i\}}{\sum_{0}^{N-1} p(x_i)} \tag{7}$$

The calculation unit 104 acquires the detection output of the tactile sensor 15 at a predetermined sampling period, for example, performs calculation based on the above-described formula (7), and obtains a difference between the acquired center of pressure $X_{cop}$ and the center of pressure $X_{cop}$ acquired in the previous calculation. The calculation unit 104 outputs this difference as a fingertip shear displacement amount $\Delta u_r$. Note that the fingertip rotational displacement amount $\Delta u_{theta}$ can be calculated based on a change amount in an angular direction of the center of pressure CoP.

The fingertip shear displacement amount $\Delta u_r$ and the fingertip rotational displacement amount $\Delta u_{theta}$ output from the calculation unit 104 are input to one input terminal of the subtractor 105, respectively. Target values $u_{r\_ref}$ and $u_{theta\_ref}$ of the fingertip shear displacement amount $\Delta u_r$ and the fingertip rotational displacement amount $\Delta u_{theta}$ are input to the other input terminal of the subtractor 105. Here, as the target values $u_{r\_ref}$ and $u_{theta\_ref}$, a value "0" is input to the other input terminal of the subtractor 105. These target values $u_{r\_ref}$ and $u_{theta\_ref}$ are supplied as information included in the control information from the overall control unit 20, for example. Not limited to this, these target values $u_{r\_ref}$ and $u_{theta\_ref}$ may be stored in advance in a memory or the like included in the gripping force control unit 10.

The subtractor 105 supplies to the gripping force generation unit 100 a value obtained by subtracting the fingertip shear displacement amount $\Delta u_r$ input to one input terminal from the target value $u_{r\_ref}$ input to the other input terminal.

The gripping force generation unit 100 generates a gripping force for the robot hand 11 to grip the object 300. More specifically, the gripping force generation unit 100 calculates a shearing force $f_t$ by applying the value supplied from the subtractor 105 to the fingertip shear displacement amount $u_r$ of the formula (5) described above. Furthermore, the gripping force generation unit 100 calculates the normal force $f_n$ from the above-described formula (5) on the basis of the value supplied from the subtractor 105 and the shearing force $f_t$. In addition, the gripping force generation unit 100 similarly calculates a moment n with respect to the fingertip rotational displacement amount $u_{theta}$ using the formula (6).

The normal force $f_n$ calculated here corresponds to the fingertip shear displacement amount $\Delta u_r$, and is hereinafter referred to as a normal force $\Delta f_n$. Similarly, the moment n calculated here corresponds to fingertip rotational displacement amount $\Delta u_{theta}$, and is hereinafter referred to as a moment $\Delta n$. For example, the gripping force generation unit 100 generates a gripping force according to the normal force $\Delta f_n$ and the moment $\Delta n$. More specifically, the gripping force generation unit 100 calculates, as the gripping force, torque information $\tau_0$ indicating a torque for driving an actuator included in the plant 30, for example, corresponding to the normal force $\Delta f_n$ and the moment $\Delta n$. The torque information $\tau_0$ generated by the gripping force generation unit 100 is input to one input terminal of the adder-subtractor 102.

The reference force generation unit 101 generates initial values of the normal force $f_n$ and the moment n as reference forces. The initial values of the normal force $f_n$ and the moment n are, for example, a normal force $f_n$ and a moment n when the robot hand 11 first grips the object 300 that is a current processing target. In this case, the initial values are a normal force $f_n$ and a moment n in a state where the shearing force $f_t$ by the hand 301 is not applied to the object 300 gripped by the robot hand 11. The reference force generation unit 101 generates reference forces according to the normal force $f_n$ and the moment n. More specifically, the reference force generation unit 101 generates torque information $\tau_1$ as a reference force.

As an example, the reference force generation unit 101 is a memory, and stores the gripping force (torque information $\tau_0$ in this example) generated by the gripping force generation unit 100 in this state as the reference force (torque information $\tau_1$ in this example). Not limited to this, the reference force generation unit 101 may store, as the reference force, torque information T that is an actual torque used by the drive control unit 103 described later to drive the plant 30. The reference force generated (read) by the reference force generation unit 101 is input to the other input terminal of the adder-subtractor 102.

The adder-subtractor 102 subtracts or adds the reference force input from the reference force generation unit 101 and the gripping force input from the gripping force generation unit 100. A result of addition or subtraction based on the reference force and the gripping force, which is performed by the adder-subtractor 102, is output as information indicating the gripping force for actually driving the plant 30.

Here, in a case where the object 300 gripped by the robot hand 11 is passed (transferred) to the hand 301, the adder-subtractor 102 subtracts the gripping force from the reference force. On the other hand, in a case where the robot hand 11 receives the object 300 from the hand 301, the adder-subtractor 102 adds the gripping force to the reference force.

Whether the robot hand 11 transfers or receives the object 300 can be determined using, for example, a sensor output of the acceleration sensor 110. As an example, the gripping force generation unit 100 detects a direction of the gravity Mg based on the sensor output of the acceleration sensor 110. In addition, the gripping force generation unit 100 detects a direction of a slip occurred in the robot hand 11 with respect to the object 300 based on the positive or negative of the fingertip shear displacement amount $\Delta u_r$. As an example, it is conceivable that the gripping force generation unit 100 determines that it is receiving in a case where the slip direction coincides with the direction of the gravity Mg, and it is a transfer in a case where the slip direction does not coincide with the direction of the gravity Mg (reverse direction).

Not limited to this, it is also possible to acquire whether the robot hand 11 transfers or receives the object 300 in accordance with an instruction from the overall control unit 20.

The information indicating the gripping force output from the adder-subtractor 102 is supplied to the drive control unit 103. The drive control unit 103 generates a drive control signal for driving the plant 30 on the basis of the supplied information indicating the gripping force. For example, the drive control unit 103 generates the torque information T indicating the torque at the time of driving the actuator included in the plant 30, for example, on the basis of the information indicating the gripping force supplied from the adder-subtractor 102. The drive control unit 103 drives the plant 30 on the basis of the generated torque information $\tau$.

Figure 7:
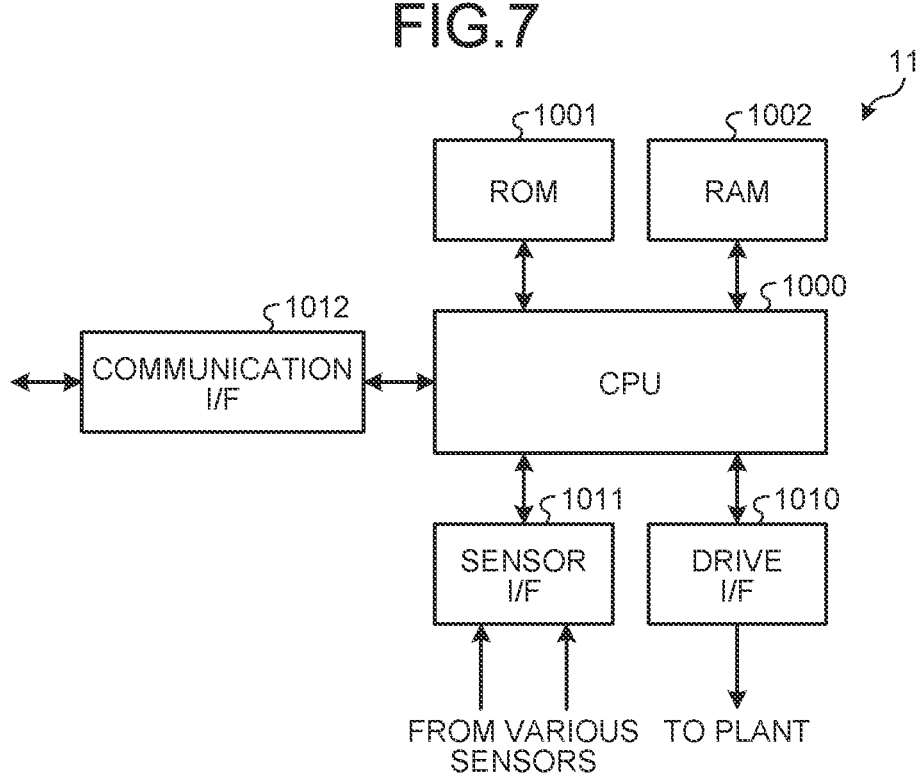
FIG. 7 is a block diagram of an example illustrating a hardware configuration of the robot hand according to the embodiment.

FIG. 7 is a block diagram of an example illustrating a hardware configuration of the robot hand 11 according to the embodiment. Note that, in FIG. 7, the configuration of a control system is extracted from the hardware configuration of the robot hand 11. In FIG. 7, the robot hand 11 includes a CPU 1000, a ROM 1001, a RAM 1002, a drive interface (I/F) 1010, a sensor I/F 1011, and a communication I/F 1012.

The CPU 1000 controls the entire operation of the robot hand 11 by using the RAM 1002 as a work memory according to a program stored in the ROM 1001.

The drive I/F 1010 is an interface between a drive unit such as various actuators included in the plant 30 and the CPU 1000. The CPU 1000 transmits a drive control signal generated according to the program to the plant 30 via the drive I/F 1010. In addition, the plant 30 transmits to the drive I/F 1010 each piece of information regarding the operation and state of the plant 30 such as status information indicating its own state. The drive I/F 1010 receives each piece of information sent from the plant 30, and passes the information to the CPU 1000.

The sensor I/F 1011 is an interface between the various sensors 31 and the CPU 1000. The sensor I/F receives sensor outputs output from the various sensors 31, and passes the received sensor outputs to the CPU 1000.

The communication I/F 1012 controls communication between the overall control unit 20 and the robot hand 11. For example, the control information output from the overall control unit 20 is transmitted to the robot hand 11 via the communication I/F 1012. The information output from the robot hand 11 can also be transmitted to the overall control unit 20 via the communication I/F 1012. Furthermore, data of a program for operating the CPU 1000 can be transmitted from the overall control unit 20 to the robot hand 11 via the communication I/F 1012. In the robot hand 11, the CPU 1000 can store in the ROM 1001 program data received from the overall control unit 20 via the communication I/F 1012. Thus, the program stored in the ROM 1001 can be updated.

A program for implementing the gripping force generation unit 100, the reference force generation unit 101, the adder-subtractor 102, the drive control unit 103, the calculation unit 104, and the subtractor 105 illustrated in FIG. 6 described above is provided by being stored on a computer connected to a network such as the Internet and being downloaded via the network. In addition, the program may be provided or distributed via a network such as the Internet. Furthermore, the program may be provided by being recorded in a computer-readable recording medium such as a compact disk (CD), a flexible disk (FD), or a digital versatile disk (DVD) as a file in an installable format or an executable format.

Each program for realizing the gripping force generation unit 100, the reference force generation unit 101, the adder-subtractor 102, the drive control unit 103, the calculation unit 104, and the subtractor 105 has a module configuration including, for example, the gripping force generation unit 100, the reference force generation unit 101, the adder-subtractor 102, the drive control unit 103, the calculation unit 104, and the subtractor 105. As actual hardware, when the CPU 1000 reads each program from a storage medium such as the ROM 1001 and executes the program, each of the above-described units or components is loaded on a main storage device such as the RAM 1002, and each of the units or components is generated on the main storage device.

2-4. Control of Transfer Operation According to Embodiment

Next, the control of the transfer operation of passing the object 300 from the robot hand 11 to the hand 301 according to the embodiment will be described more specifically. FIG.

8 is a flowchart of an example schematically illustrating the control of the transfer operation according to the embodiment.

Figure 8:
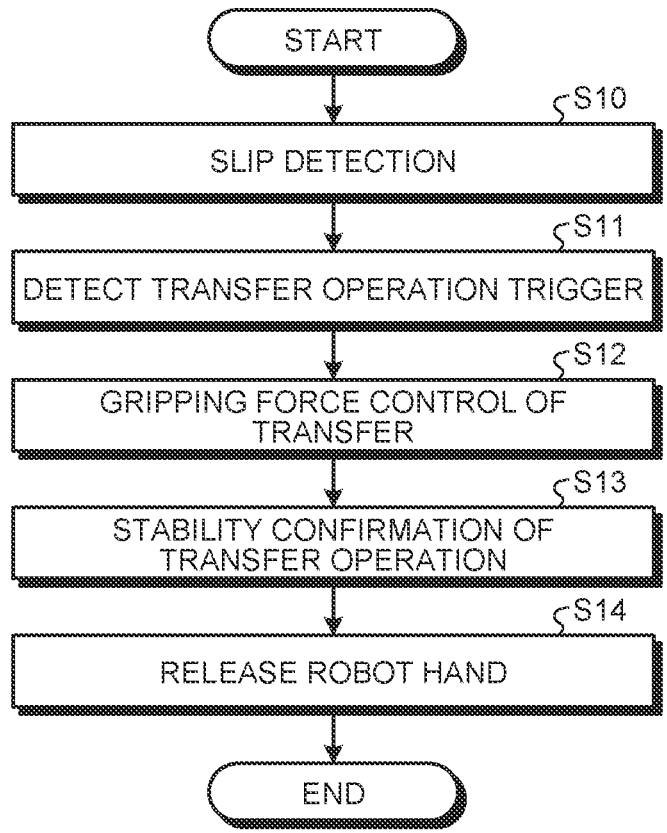
FIG. 8 is a flowchart of an example schematically illustrating control of a transfer operation according to the embodiment.

It is assumed that the robot hand 11 grips the object 300 vertically (in a direction parallel to the gravity Mg) prior to the start of processing according to the flowchart of FIG. 8. In this state, a case where the hand 301 pulls up the object 300 in, for example, a direction opposite to the direction of the gravity Mg and receives the object from the robot hand 11 will be considered.

The gripping force control unit 10 constantly observes the slip of the finger portions 13a and 13b at the respective fingertip portions (Step S10). More specifically, the gripping force control unit 10 constantly observes a difference between the fingertip shear displacement amount $\Delta u_r$ and the fingertip rotational displacement amount $\Delta u_{theta}$, and the target values $u_{r\_ref}$ and $u_{theta\_ref}$ as information indicating the slip, and detects the slip.

Hereinafter, for the sake of explanation, unless otherwise specified, the difference between the fingertip shear displacement amount $\Delta u_r$ and the target value $u_{r\_ref}(=0)$ is set as the fingertip shear displacement amount $\Delta u_r$. Similarly, unless otherwise specified, the difference between the fingertip rotational displacement amount $\Delta u_{theta}$ and the target value $u_{theta\_ref}(=0)$ is set as the fingertip rotational displacement amount $u_{theta}$.

The gripping force control unit 10 detects a trigger of the transfer operation on the basis of the slip detection result (Step S11). In the next Step S12, the gripping force control unit 10 controls the gripping force in the transfer operation of passing the object 300 to the hand 301. In the next Step S13, the gripping force control unit 10 checks whether or not the transfer operation has been stabilized by the control of the gripping force in Step S12. When the stability of the transfer operation is confirmed, the gripping force control unit 10 releases the robot hand 11. As a result, the object 300 gripped by the robot hand 11 is passed to the hand 301, and the transfer operation is completed.

Figure 9:
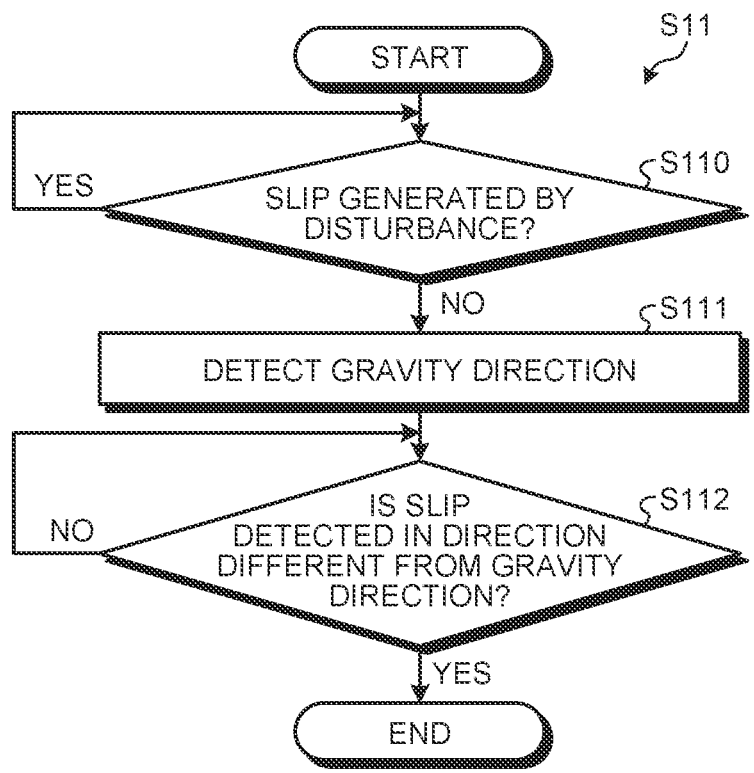
FIG. 9 is a flowchart of an example illustrating a trigger detection operation of the transfer operation according to the embodiment.

FIG. 9 is a flowchart of an example illustrating a trigger detection operation of the transfer operation according to the embodiment. Processing according to the flowchart of FIG. 9 corresponds to the processing of Step S11 in FIG. 8.

In FIG. 9, in Step S110, the gripping force control unit 10 determines whether or not the detected slip is a slip generated by disturbance.

As an example, the gripping force control unit 10 can detect a slip speed and determine whether or not the slip is a slip generated by disturbance on the basis of the slip speed. In this determination, for example, in a case where the fingertip shear displacement amount $\Delta u_r$ exceeds another threshold set to a larger value as an absolute value with respect to the above-described threshold in a case where the slip detection is performed, it can be determined that the detected slip is the slip due to the disturbance.

As another example, the gripping force control unit 10 can determine whether or not the detected slip is a slip due to disturbance by using machine learning such as long short-term memory (LSTM). In this case, it is conceivable to perform determination using learning data obtained by inputting time-series data of position information acquired on the basis of an output of the tactile sensor 15 and learning whether or not there is disturbance as output data.

When the gripping force control unit 10 determines that the detected slip is a slip generated by disturbance (Step S110, "Yes"), the processing returns to Step S110. On the other hand, when the gripping force control unit 10 determines that the detected slip is not a slip generated by disturbance (Step S110, "No"), the processing proceeds to Step S111.

In Step S111, the gripping force control unit 10 detects a direction of the gravity Mg. The direction of the gravity Mg can be detected based on a sensor output of the acceleration sensor 110. Not limited to this, the direction of the gravity Mg can be detected by predicting the current attitude of the robot hand 11 on the basis of the history of operations such as movement and rotation of the robot hand 11.

In the next Step S112, the gripping force control unit 10 determines whether or not a slip in a direction different from the direction of the gravity Mg detected in Step S111 has been detected. For example, in a case where an absolute value of the fingertip shear displacement amount $\Delta u_r$ exceeds the threshold, the gripping force control unit 10 determines that the slip has been detected. Furthermore, the gripping force control unit 10 determines whether or not the direction of the slip is a direction different from the direction of the gravity Mg based on the positive or negative of the value of the fingertip shear displacement amount $\Delta u_r$ in a case where the slip has been detected.

When it is determined that the slip different from the direction of the gravity Mg is not detected (Step S112, "No"), the gripping force control unit 10 returns the processing to Step S112. On the other hand, when it is determined that the slip in the direction different from the direction of the gravity Mg is detected, the gripping force control unit 10 determines that a trigger of the transfer operation is detected, and ends a series of processing according to the flowchart of FIG. 9. Then, the processing proceeds to the processing of Step S12 in FIG. 8.

Figure 10:
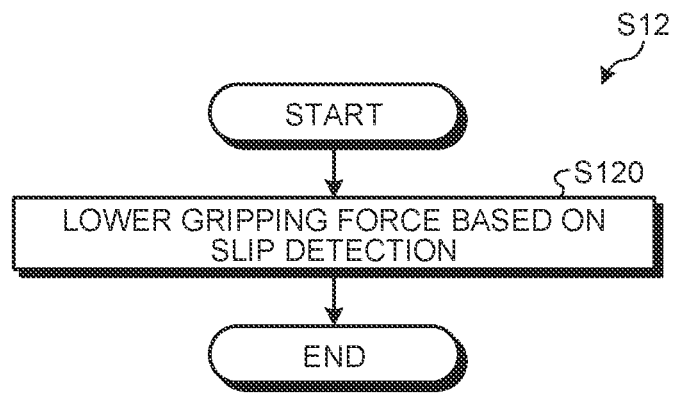
FIG. 10 is a flowchart of an example illustrating an operation of controlling a transfer gripping force according to the embodiment.

FIG. 10 is a flowchart of an example illustrating an operation of controlling a transfer gripping force according to the embodiment. Processing according to the flowchart of FIG. 10 corresponds to the processing of Step S12 in FIG. 8.

In Step S120, the gripping force control unit 10 lowers the gripping force on the basis of the slip detection result. For example, when at least one of the fingertip shear displacement amount $\Delta u_r$ and the fingertip rotational displacement amount $\Delta u_{theta}$ (each absolute value) has a value exceeding 0 in the absolute value, the gripping force control unit 10 lowers the gripping force (normal force $f_{nR}$) by the robot hand 11 by a predetermined amount.

That is, in this example, the hand 301 pulls up the object 300 in a direction opposite to the direction of the gravity Mg to receive the object 300 from the robot hand 11. In this case, it is considered that a slip generated between the robot hand 11 and the object 300 indicates a state in which the hand 301 feels a slight resistance to the pulling up of the object 300 when the hand 301 tries to pull up the object 300 gripped by the robot hand 11, for example.

When lowering the gripping force by a predetermined amount in Step S120, the gripping force control unit 10 ends a series of processing according to the flowchart in FIG. 10 and shifts the processing to Step S13 in FIG. 8.

Figure 11:
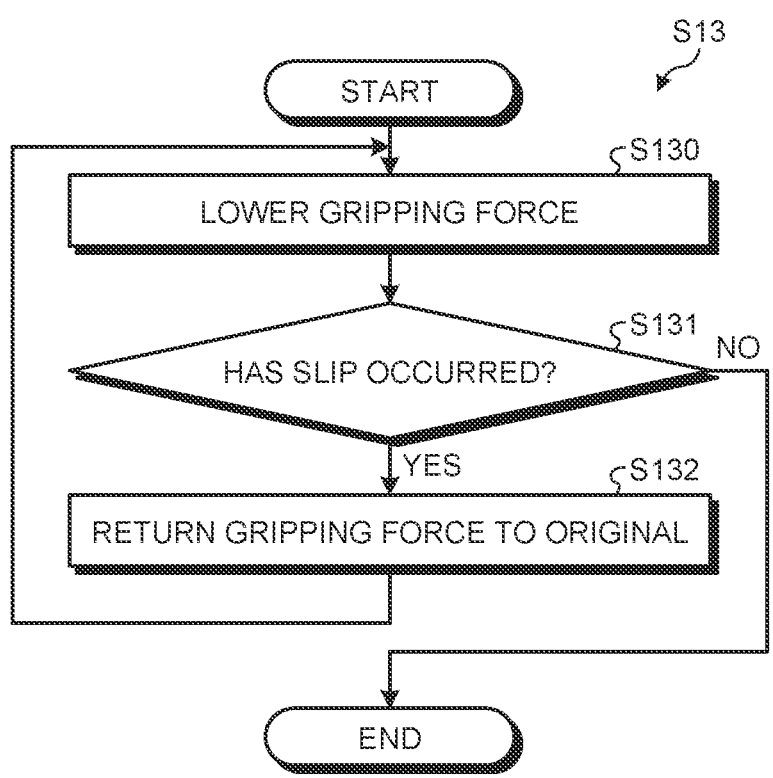
FIG. 11 is a flowchart of an example illustrating an operation of the stability confirmation of the transfer operation according to the embodiment.

FIG. 11 is a flowchart of an example illustrating an operation of the stability confirmation of the transfer operation according to the embodiment. Processing according to the flowchart of FIG. 11 corresponds to the processing of Step S13 in FIG. 8.

In Step S130, the gripping force control unit 10 lowers the gripping force (normal force $f_{nR}$) by a predetermined amount. It is conceivable that the degree of decrease in the gripping force at this time is smaller than the degree of decrease in Step S120 in FIG. 10 described above, for example. In the next Step S131, the gripping force control unit 10 determines whether or not a slip has occurred in a similar manner to Step S120 in FIG. 10 described above.

In Step S131, after the gripping force is lowered in Step S120 in the flowchart of FIG. 10 described above, the slip is determined in a state where the gripping force is further lowered in Step S130. Therefore, this slip occurs because the gripping force by the robot hand 11 cannot resist a force in the direction of the gravity Mg obtained by combining the shearing force $f_{tH}$ of the hand 301 and the gravity Mg acting in the opposite direction to the shearing force $f_{tH}$.

When determining that the slip has occurred (Step S131, "Yes"), the gripping force control unit 10 shifts the processing to Step S132 to return the gripping force (normal force $f_{nR}$) by the robot hand 11 to the original. For example, the gripping force control unit 10 returns the gripping force to the state immediately before Step S130. When the gripping force is restored in Step S132, the gripping force control unit 10 returns the processing to Step S130.

On the other hand, when determining that no slip has occurred in Step S131 (Step S131, "No"), the gripping force control unit 10 ends a series of processing according to the flowchart of FIG. 11. Then, the gripping force control unit 10 shifts the processing to Step S14 in the flowchart of FIG. 8 to release the robot hand 11.

As described above, in the embodiment, the robot hand 11 detects the slip at the fingertip portion gripping the object 300, and controls the gripping force for gripping the object 300 on the basis of the detected slip. At this time, in the embodiment, since the slip is detected by the tactile sensor 15 provided at the fingertip portion, a minute change in external force can be detected, and more natural transfer of the object 300 from the robot hand 11 to the hand 301 can be realized.

Furthermore, in the embodiment, by using the tactile sensor 15 provided at the fingertip portion of the robot hand 11, it is possible to easily distinguish whether the detected external force is an external force applied to the robot hand 11 or an external force applied to the object 300 gripped by the robot hand 11. Therefore, it is possible to achieve a transfer of an object having high robustness against an external force.

Furthermore, in the embodiment, it is possible to appropriately lower the gripping force (release the force) while feeding back an external force applied to the object 300 according to the slip detected by the tactile sensor 15 provided at the fingertip portion of the robot hand 11. Therefore, it is possible to avoid damage of the object 300 due to application of an excessive force to the object 300 to be transferred, falling of the object 300 due to too weak force to grip the object 300, and the like.

2-5. Operation in Arbitrary Transfer Direction According to Embodiment

In the above description, the transfer control in a case where the direction of the shearing force of the robot hand 11 coincides with the direction of the gravity Mg has been described. Not limited thereto, the transfer control according to the embodiment is established in an arbitrary direction. Hereinafter, (1) transfer control in a case where the direction of the shearing force $f_t$ of the robot hand 11 coincides with the direction of the gravity Mg, and (2) transfer control in a case where the direction of the shearing force $f_t$ of the robot hand 11 does not coincide with the direction of the gravity Mg will be described.

Note that, although details will be described later, in order to establish a balance of forces in the direction of the normal force $f_n$ in an arbitrary gripping attitude, it is preferable to apply position restraint in addition to the control of the gripping force described above.

Figure 12A:
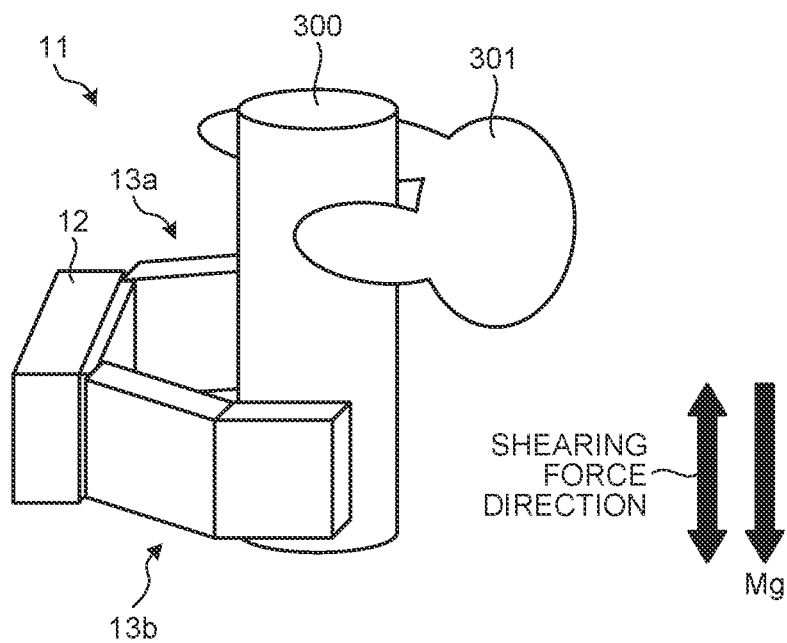
FIG. 12A is a diagram schematically illustrating an example of a case where a direction of a shearing force $f_t$ of the robot hand coincides with a direction of gravity Mg.
Figure 12B:
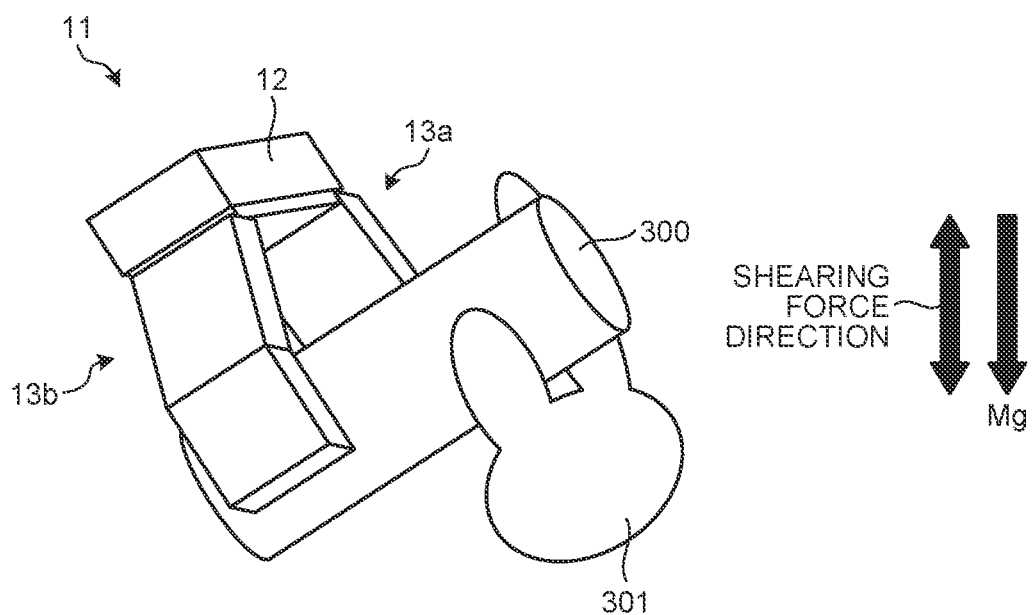
FIG. 12B is a diagram schematically illustrating an example of a case where the direction of the shearing force $f_t$ of the robot hand coincides with the direction of the gravity Mg.

First, the transfer control in a case where the direction of the shearing force $f_t$ of the robot hand 11 coincides with the direction of the gravity Mg in (1) will be described. FIGS. 12A and 12B are diagrams schematically illustrating an example of a case where the direction of the shearing force $f_t$ of the robot hand 11 coincides with the direction of the gravity Mg. In other words, in FIGS. 12A and 12B, the direction of the normal force $f_{nR}$ of the robot hand 11 and the normal force $f_{nH}$ when the hand 301 grips the object 300 are perpendicular to the direction of the gravity Mg.

In the example of FIG. 12A, similarly to the above description, similarly to the above description, the finger portions 13a and 13b of the robot hand 11 grip the object 300 in the vertical direction. When the hand 301 pulls up the object 300 in an upward direction on the drawing, the transfer of the object 300 from the robot hand 11 to the hand 301 is performed. Furthermore, in the example of FIG. 12B, the hand 301 pulls up the object 300 diagonally upward to the right in the drawing, so that the robot hand 11 grips the object 300 from diagonally upward to the left in the drawing. When the hand 301 pulls up the object 300 diagonally upward to the right in the drawing, the transfer of the object 300 from the robot hand 11 to the hand 301 is performed.

The fingertip shear displacement amount $\Delta u_r$ in a case where the shearing force $\Delta f_{tH}$ of the hand 301 is applied as an external force on the object 300 is observed. Then, a case where the normal force $\Delta f_{nR}$ of the robot of the robot hand 11 necessary for preventing the fingertip shear displacement amount $\Delta u_r$ from being generated is weakened is considered. In this case, the shearing force $f_{tR}$ of the robot hand 11 is expressed by the following formula (8).

$$\sum_{i=1}^{N} f_{tRi} = \sum_{i=1}^{N} f_{tRi} - \sum_{i=1}^{N} \Delta f_{tHi} \tag{8}$$

Here, it is assumed that the hand 301 generates a gripping force (normal force) $\Delta f_{nH}$ that only generates an external force $\Delta f_{tH}$ applied to the object 300 and satisfies the following formula (9). In this case, it is assumed that a force $\Delta f_{gH}$ that satisfies the following formula (10) and is equivalent to the shearing force $\Delta f_{tH}$ can be generated also in the direction of the gravity Mg.

$$\mu_H \Delta f_{nH} \geq \Delta f_{tH} \tag{9}$$

$$\mu_H \Delta f_{nH} \geq \Delta f_{gH} \tag{10}$$

At this time, the shearing force $f_{tH}$ of the hand 301 is expressed by the following formula (11).

$$\sum_{i=1}^{N} f_{tHi} = \sum_{i=1}^{N} \Delta f_{tHi} \tag{11}$$

Substituting the formula (8) and the formula (11) into the formula (3) described above and considering a force balance, it is confirmed that a force balance in a shear direction is maintained as shown in the following formula (12).

$$\sum_{i=1}^{N} f_{tRi} + \sum_{i=1}^{N} f_{tHi} + Mg = \sum_{i=1}^{N} f_{tRi} - \sum_{i=1}^{N} \Delta f_{tHi} + \sum_{i=1}^{N} \Delta f_{tHi} + Mg = 0 \tag{12}$$

Note that a balance of the forces in the normal force direction is canceled by the forces exerted by the respective fingers, and the description thereof will be omitted here.

Figure 13A:
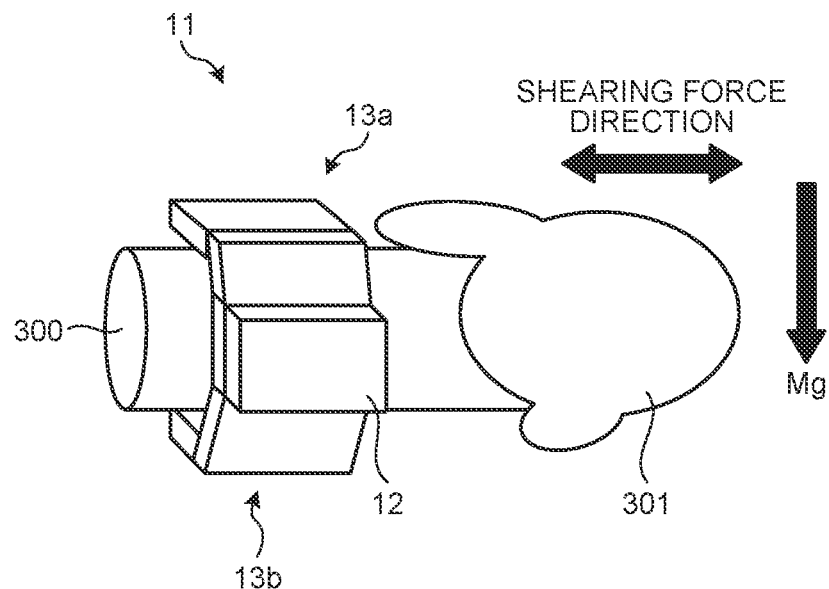
FIG. 13A is a diagram schematically illustrating an example of a case where the direction of the shearing force $f_t$ of the robot hand does not coincide with the direction of the gravity Mg.
Figure 13B:
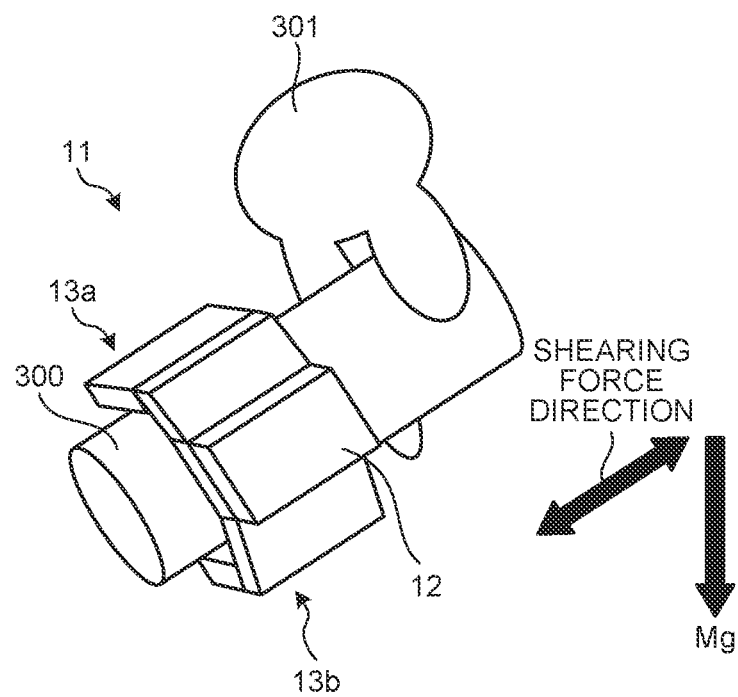
FIG. 13B is a diagram schematically illustrating an example of a case where the direction of the shearing force $f_t$ of the robot hand does not coincide with the direction of the gravity Mg.

Next, the transfer control in a case where the direction of the shearing force $f_t$ of the robot hand 11 does not coincide with the direction of the gravity Mg in (2) will be described. FIGS. 13A and 13B are diagrams schematically illustrating an example of a case where the direction of the shearing force $f_t$ of the robot hand 11 does not coincide with the direction of the gravity Mg.

In FIG. 13A, the direction of the normal force $f_{nR}$ of the robot hand 11 and the normal force $f_{nH}$ when the hand 301 grips the object 300 coincide with the direction of the gravity Mg. When the hand 301 pulls the object 300 in the horizontal direction on the drawing, the transfer of the object 300 from the robot hand 11 to the hand 301 is performed. On the other hand, in FIG. 13B, the directions of the normal forces $f_{nR}$ and $f_{nH}$ have an angle ($\neq 0°$) with respect to the direction of the gravity Mg. When the hand 301 pulls up the object 300 diagonally upward to the right in the drawing, the transfer of the object 300 from the robot hand 11 to the hand 301 is performed.

Here, for the sake of explanation, the state illustrated in FIG. 13A will be described as an example.

The fingertip shear displacement amount $\Delta u_r$ in a case where the shearing force $f_{tH}$ of the hand 301 is applied as an external force on the object 300 is observed. Then, a case where the normal force $\Delta f_{nR}$ of the robot of the robot hand 11 necessary for preventing the fingertip shear displacement amount $\Delta_{ur}$ from being generated is weakened is considered. In this case, the normal force $f_{nR}$ and the shearing force $f_{tR}$ of the robot hand 11 are expressed by the following formulas (13) and (14), respectively.

$$\sum_{i=1}^{N} f_{nRi} = \sum_{i=1}^{N} f_{nRi} - \sum_{i=1}^{N} \Delta f_{nRi} \qquad (13)$$

$$\sum_{i=1}^{N} f_{tRi} = \sum_{i=1}^{N} f_{tRi} - \sum_{i=1}^{N} \Delta f_{tRi} \qquad (14)$$

At this time, the normal force $f_{nH}$ and the shearing force $f_{tH}$ of a person are expressed by the following formulas (15) and (16), respectively.

$$\sum_{i=1}^{N} f_{nHi} = \sum_{i=1}^{N} \Delta f_{nHi} \qquad (15)$$

$$\sum_{i=1}^{N} f_{tHi} = \sum_{i=1}^{N} \Delta f_{tHi} \qquad (16)$$

When the formulas (13) to (16) are substituted into the formula (3) described above and a force balance is considered, the following formulas (17) and (18) are obtained, respectively. Note that "0(?)" at the end of the formula (17) indicates that it is unknown whether or not a value "0" is obtained as a result of the formula (17).

$$\sum_{i=1}^{N} f_{nRi} + \sum_{i=1}^{N} f_{nHi} + Mg = \sum_{i=1}^{N} f_{nRi} - \sum_{i=1}^{N} \Delta f_{nRi} + \sum_{i=1}^{N} \Delta f_{nHi} + Mg = 0(?) \qquad (17)$$

-continued $$\sum_{i=1}^{N} f_{tRi} + \sum_{i=1}^{N} f_{tHi} = \sum_{i=1}^{N} f_{tRi} - \sum_{i=1}^{N} \Delta f_{tHi} + \sum_{i=1}^{N} \Delta f_{tHi} = 0 \qquad (18)$$

In this case, the normal force $\Delta f_{nR}$ of the robot hand 11 and the normal force $\Delta f_{nH}$ of the hand 301 generate gripping forces that satisfy the following formulas (19) and (20), respectively.

$$\mu_R \Delta f_{nR} \geq f_{tH} \qquad (19)$$

$$\mu_H \Delta f_{nH} \geq f_{tH} \qquad (20)$$

However, there is no guarantee that the normal force $\Delta f_{nR}$ of the robot hand 11 is equal to the normal force $\Delta f_{nH}$ of the hand 301 ($\Delta f_{nR} = \Delta f_{nH}$). If the friction coefficients coincide with each other ($\mu_R = \mu_H$) and the robot hand 11 and the hand 301 can grip the object 300 with a force immediately before the object 300 slides out, the balance of the forces in the normal direction is established. However, it is understood that the right side=0 of the formula (17) is not established unless both the coincidence of these friction coefficients and the gripping of the robot hand 11 and the hand 301 with the force immediately before the object 300 slides out are satisfied.

Note that it is confirmed that the balance of the forces in the shear direction is established as indicated by the above-described formula (18).

As described above, depending on the gripping attitude of the robot hand 11, the direction of the shearing force $f_{tR}$ of the robot hand 11 may not coincide with the direction of the gravity Mg. In that case, it can be seen that the force balance in the shear direction is established, but there is no guarantee that the force balance in the normal direction is established.

Figure 14:
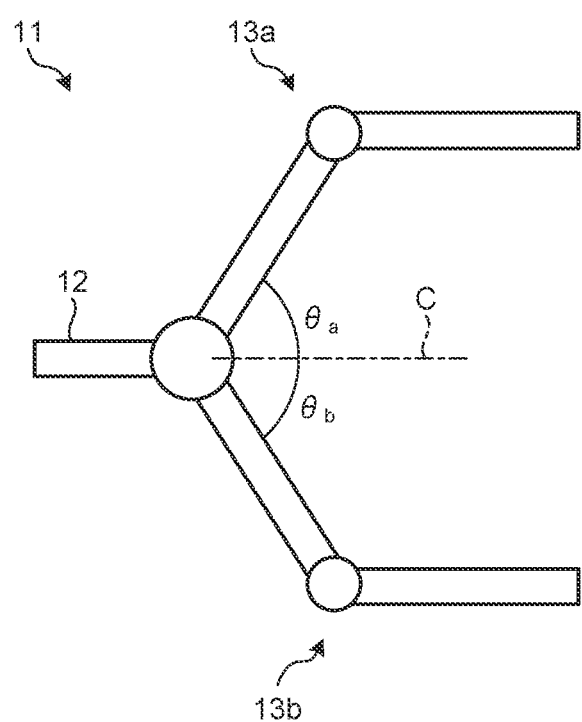
FIG. 14 is a diagram for explaining a deviation.

Examples of the situation in which the balance of the forces in the normal direction is not established include a case where the friction coefficient $\mu_R$ between the robot hand 11 and the object 300 is larger than the friction coefficient $\mu_N$ between the finger of the hand 301 and the object 300 ($\mu_R > \mu_H$). In this case, the gripping force (normal force) $\Delta f_{nR}$ of the robot hand 11 becomes smaller than the gripping force $\Delta f_{nH}$ of the hand 301 ($\Delta f_{nR} < \Delta f_{nH}$). In this case, a force supported by the robot hand 11 and the hand 301 increases with respect to the weight of the object 300, and the object 300 moves in the direction opposite to the gravity Mg. This means that a deviation $\delta$ between the positions of the fingers of the robot hand 11 increases as shown in the following formula (21). As schematically illustrated in FIG. 14, a positional deviation $\delta$ corresponds to a difference between degrees of opening $\theta_d$ and $\theta_b$ of the finger portions 13a and 13b with respect to a symmetry center C.

$$\sum_{i=1}^{N} f_{nRi} + \sum_{i=1}^{N} f_{nHi} + Mg = \sum_{i=1}^{N} f_{nRi} - \sum_{i=1}^{N} \Delta f_{nRi} + \sum_{i=1}^{N} \Delta f_{nHi} + Mg = +\delta \qquad (21)$$

Therefore, in addition to the force control of this algorithm, position control is applied such that the positional deviation $\delta$ between the finger portion 13a and the finger portion 13b of the robot hand 11 becomes 0. This makes it possible to achieve both the balance of the forces in the shear direction and the balance of the forces in the normal direction.

When the robot hand 11 transfers the object 300 to the hand 301, it is possible to estimate from which direction the hand 301 receives the object 300 to some extent from a gripping position of the robot hand 11 by the tactile sensor 15. However, strictly speaking, it is not known from which direction the hand 301 receives until the hand 301 starts a receiving operation. In the transfer control according to the embodiment, as described above, the transfer operation in an arbitrary direction is possible, and a more flexible transfer operation can be realized.

2-6. Application Example of Control According to Embodiment

Note that, in the above description, the control according to the embodiment has been described to be applied to the transfer of the object 300, but this is not limited to this example. As an application example of the control according to the embodiment, it is also possible to apply the control to a floor placing operation in which it is necessary to release the force.

As a control method of the floor placing operation, it is conceivable to apply a simple control method by an existing method in which a threshold equivalent to the weight of the object 300 is determined and the gripping force is lowered, unlike the transfer operation. However, in the control by the existing method, the object 300 to be gripped is limited to a rigid body. In a case where the symmetrical object 300 to be gripped is a flexible object that is deformed or damaged by applying an excessive force, it is possible to avoid the object itself from being damaged when being placed on the floor by applying the control of the gripping force such that the balance of the forces and the balance of the moments are established in consideration of the magnitude of the external force according to the embodiment.

3. First Modification of Embodiment

Next, a first modification of the embodiment will be described. In the embodiment described above, the control according to the present disclosure is applied to the transfer operation of passing the object 300 gripped by the robot hand 11 to the hand 301. In the first modification of the embodiment, the control according to the present disclosure is applied to a receiving operation in which the robot hand 11 receives the object 300 from the hand 301.

Figure 15:
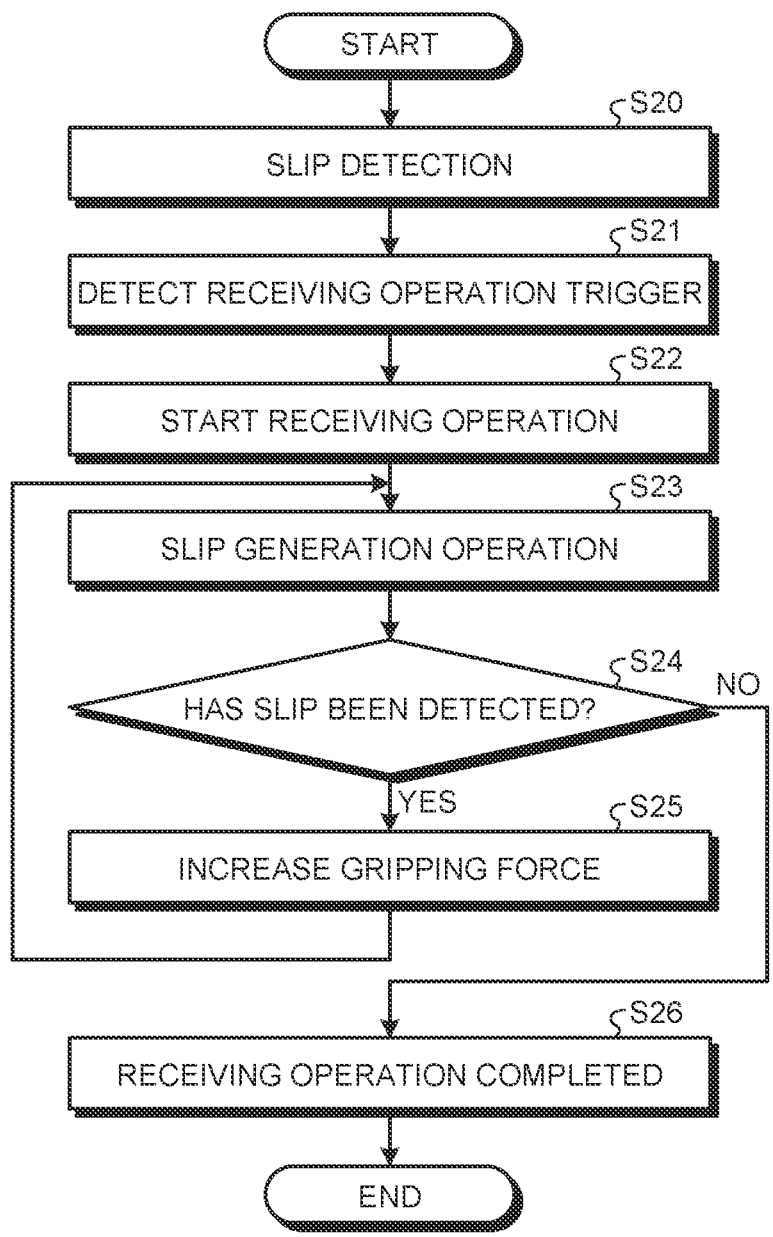
FIG. 15 is a flowchart of an example schematically illustrating control of a receiving operation according to a first modification of the embodiment.

FIG. 15 is a flowchart of an example schematically illustrating the control of the receiving operation according to the first modification of the embodiment. Here, for the sake of explanation, in the robot hand 11, the positions of the finger portions 13a and 13b are controlled in advance such that the object 300 to be received comes into contact with the elastic body 14 provided at the fingertip portion of each of the finger portions 13a and 13b. In this state, a case where the hand 301 slides the object 300 between the fingertip portion of the finger portion 13a and the fingertip portion of the finger portion 13b, for example, to pass the object 300 to the robot hand 11 will be considered.

The gripping force control unit 10 constantly observes a slip of the finger portions 13a and 13b at the respective fingertip portions (Step S20). When detecting the trigger of the transfer operation based on the slip detection result (Step S21), the gripping force control unit 10 shifts the processing to the next Step S22 and starts the receiving operation of the object 300.

In the processing of Step S21, for example, similarly to the control described with reference to the flowchart of FIG. 9, the gripping force control unit 10 determines whether or not the detected slip is a slip generated by disturbance using a slip speed and machine learning. In a case where it is determined that the detected slip is not a slip generated by disturbance, the gripping force control unit 10 detects the direction of the gravity Mg. Then, the gripping force control unit 10 determines whether or not a slip in the same direction as the detected direction of the gravity Mg has been detected. In a case where it is determined that the slip in the same direction as the direction of the gravity Mg has been detected, the gripping force control unit 10 determines that a trigger of the receiving operation has been detected, and shifts the processing to Step S22.

In Step S23, the gripping force control unit 10 slightly lowers the gripping force to generate a slip. In the next Step S24, the gripping force control unit 10 determines whether the slip has been detected. When the gripping force control unit 10 determines that the slip has been detected (Step S24, "Yes"), the processing proceeds to Step S25.

In Step S25, the gripping force control unit 10 slightly increases the gripping force. For example, the gripping force control unit 10 increases the gripping force by a slightly smaller degree than the degree of decrease in the gripping force in Step S23. When increasing the gripping force in Step S25, the gripping force control unit 10 returns the processing to Step S23.

On the other hand, when the gripping force control unit 10 determines that no slip is detected in Step S24 (Step S24, "No"), the processing proceeds to Step S26, and it is assumed that the receiving of the object 300 from the hand 301 is completed.

As described above, in the first modification of the embodiment, the robot hand 11 detects the slip at the fingertip portion gripping the object 300, and controls the gripping force for gripping the object 300 on the basis of the detected slip. At this time, in the embodiment, since the slip is detected by the tactile sensor 15 provided at the fingertip portion, a minute change in the external force can be detected, and the operation in which the robot hand 11 receives the object 300 from the hand 301 can be realized by a more natural operation.

4. Second Modification of Embodiment

Next, a second modification of the embodiment will be described. In the second modification of the embodiment, in addition to the tactile sensor 15, an image sensor that detects visual information is used to control the transfer operation.

Figure 16:
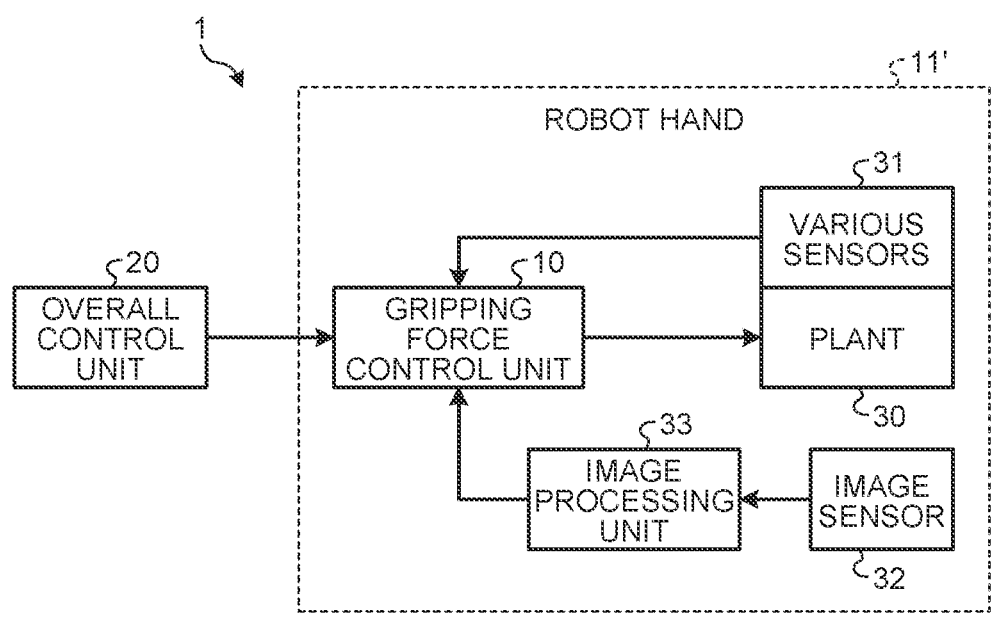
FIG. 16 is a block diagram schematically illustrating a configuration of a robot apparatus to which a robot hand according to a second modification of the embodiment is applied.

FIG. 16 is a block diagram schematically illustrating a configuration of a robot apparatus 1 to which a robot hand 11' according to the second modification of the embodiment is applied. In FIG. 16, the robot hand 11' is obtained by adding an image sensor 32 and an image processing unit 33 to the robot hand 11 according to the embodiment described with reference to FIG. 5.

The image sensor 32 includes a general image sensor such as a complementary metal oxide semiconductor (CMOS) image sensor or a charge coupled device (CCD) image sensor, and a drive circuit that drives the image sensor. For example, the image sensor 32 is disposed such that at least the fingertip portions of the finger portions 13a and 13b of the robot hand 11 are included in an imaging range. A captured image data output from the image sensor 32 is supplied to the image processing unit 33.

The image processing unit 33 executes predetermined image processing on the captured image data supplied from the image sensor 32. For example, the image processing unit 33 executes image recognition processing of recognizing a predetermined object included in the captured image data. The image processing unit 33 supplies a result of executing the image processing on the captured image data to, for example, the gripping force control unit 10.

As an example, the gripping force control unit 10 detects a state of the transfer of the object 300 and information on a transfer partner on the basis of the visual information (captured image data in this example) acquired by the image sensor 32 by the image processing of the image processing unit 33. The gripping force control unit 10 combines the information detected on the basis of the visual information, and for example, performs control to multiply the gripping force to be decreased in the transfer operation by a variable parameter. For example, in a case where a small child receives the object 300 in an unstable situation, it is possible to provide a margin for force balance and moment balance by applying a variable parameter for lowering the gripping force to be decreased. Regarding the setting of the variable parameter, for example, a method is conceivable in which machine learning with visual information as an input and safety of a transfer as an output is used in the image processing unit 33.

The image processing unit 33 supplies the set variable parameter to the gripping force control unit 10 as a result of the image processing. The variable parameter may be set in the gripping force control unit 10 based on the output of the image processing unit 33.

In addition, by predicting in advance a direction in which a transfer partner receives the object 300 from the visual information acquired by the image sensor 32 and matching the direction with a slip direction, it is possible to control the gripping force by further utilizing the slip direction. For example, in a case where it is known that the direction in which the hand 301 receives the object 300 by a transfer is a vertically downward direction on the basis of the visual information, it is possible to improve the robustness by decreasing the gripping force only with respect to the slip in the vertically downward direction.

Furthermore, a scene or user information that can be acquired on the basis of the visual information is used in combination with the transfer operation trigger detection processing in Step S11 in FIG. 8, so that the transfer operation trigger can be more robustly detected. For example, it is possible to recognize that the hand 301 is approaching the robot hand 11 on the basis of the visual information, and to determine that the trigger of the transfer operation is detected in a case where the hand 301 is approaching within a predetermined distance.

Not limited to this, it is also possible to acquire a scene or user information using auditory information in addition to the visual information, and to detect a trigger of the transfer operation on the basis of the acquired information. The auditory information is acquired by further adding a microphone and a voice processing unit that executes voice processing on a voice signal output from the microphone to the configuration of FIG. 16, for example. An output of the voice processing unit is supplied to the gripping force control unit 10. The voice processing unit analyzes a voice signal based on a sound collected by the microphone, acquires, for example, the meaning of the utterance, and can determine whether the content of the utterance is the content for which a transfer of the object 300 from the robot hand 11 to the hand 301 is requested.

Furthermore, it is possible to predict a direction in which the hand 301 receives the object 300 from the visual information and the auditory information. By matching the predicted receiving direction with the slip direction, the trigger of the receiving operation can be detected more robustly. For example, in a case where it is known that the direction in which the receiving by the hand 301 is performed is the vertically downward direction, it is possible to determine that the receiving operation trigger is detected even in a case where the slip in the same direction as the direction of the gravity Mg is detected.

As described above, by performing the trigger detection of the transfer operation and the receiving operation by combining the detection result by the tactile sensor 15 and the visual information or the auditory information, the trigger detection with higher robustness can be realized.

5. Third Modification of Embodiment

Next, a third modification of the embodiment will be described. The third modification of the embodiment is an example in which a force sensor is provided on, for example, the wrist portion 12 of the robot hand 11 in addition to the tactile sensor 15 as the various sensors 31 in FIG. 5, and the transfer operation is controlled using the sensor outputs of the tactile sensor 15 and the force sensor.

The gripping force control unit 10 uses the sensor output of the force sensor provided on the wrist portion 12 and the sensor output of each tactile sensor 15 provided on the fingertip portion of each of the finger portions 13*a* and 13*b*. This makes it possible to distinguish between an external force applied to the robot hand 11 and an external force applied to the object 300 gripped by the robot hand 11. As an example, it is conceivable to perform threshold determination on the sensor output of the force sensor, and determine that an external force is applied to the robot hand 11 itself in a case where a force exceeding the threshold is detected in the force sensor.

As a result, when an external force that pulls the robot hand 11 is applied, it is possible to perform control to move the robot hand 11 (or the robot apparatus 1) in a pulling direction without releasing the gripped object 300. Furthermore, in a case where the object 300 is pulled, the robot hand 11 (or the robot apparatus 1) can be controlled to transfer the object 300 without moving.

Note that the effects described in the present specification are merely examples and are not limited, and other effects may be provided.

6. Other Configurations

Note that the present technology can also have the following configurations.

(1) A control device comprising:
a slip detection unit that detects a slip of a target object gripped by a grip portion; and
a control unit that controls a gripping force with which the grip portion grips the target object based on the slip detected by the slip detection unit,
wherein the control unit estimates an external force applied to the target object gripped by the grip portion based on the slip detected by the slip detection unit, and controls the gripping force based on the estimated external force.

(2) The control device according to the above (1), wherein
the slip detection unit detects a shear displacement amount generated with respect to the grip portion as the slip, and
the control unit estimates the external force based on the shear displacement amount.

(3) The control device according to the above (1), wherein
the control unit further estimates a moment applied to the target object gripped by the grip portion based on the slip detected by the slip detection unit, and controls the gripping force by further using the estimated moment.

(4) The control device according to the above (3), wherein
the slip detection unit detects a rotational displacement amount generated with respect to the grip portion as the slip, and
the control unit estimates the moment based on the rotational displacement amount.
(5) The control device according to any one of the above (1) to (4), wherein the grip portion includes:
an elastic body that comes into contact with the target object and generates a frictional force against the target object; and
a sensor that detects a force generated in the elastic body according to the frictional force, and
the slip detection unit detects the slip based on a detection output of the sensor.
(6) The control device according to the above (5), wherein
the sensor is a pressure distribution sensor that detects a pressure distribution on a two-dimensional surface, and
the slip detection unit detects the slip based on movement of a center position of a pressure distribution detected by the pressure distribution sensor.
(7) The control device according to any one of the above (1) to (6), wherein
the control unit controls the gripping force for transferring the target object gripped by the grip portion in a case where the slip detected by the slip detection unit is not a slip generated by disturbance, and is a slip in a direction different from a gravity direction.
(8) The control device according to the above (7), wherein
the control unit performs control to lower a gripping force for gripping the target object according to the slip detected by the slip detection unit.
(9) The control device according to the above (8), wherein
the control unit further performs control to lower the gripping force with which the grip portion grips the target object, and performs control to return the gripping force to a gripping force immediately before the control when the slip detection unit detects the slip of a predetermined level or more.
(10) The control device according to any one of the above (1) to (9), wherein
the control unit performs control of the gripping force based on visual information in a range including at least the grip portion and the slip detected by the slip detection unit.
(11) The control device according to the above (10), wherein
the control unit predicts a direction in which the grip portion transfers the target object based on the visual information, and performs control of the gripping force according to the predicted direction.
(12) The control device according to any one of the above (1) to (11), wherein
the control unit performs control of the gripping force by further using a detection result of a force detected at a holding portion that holds the grip portion.
(13) A control method comprising:
a slip detection step of detecting, by a slip detection unit, a slip of a target object gripped by a grip portion; and
a control step of controlling, by a control unit, a gripping force with which the grip portion grips the target object based on the slip detected in the slip detection step, wherein
the control step includes estimating an external force applied to the target object gripped by the grip portion based on the slip detected in the slip detection step, and controlling the gripping force based on the estimated external force.
(14) A control program causing a processor to execute:
a slip detection step of detecting a slip of a target object gripped by a grip portion; and
a control step of controlling a gripping force with which the grip portion grips the target object based on the slip detected in the slip detection step, wherein
the control step includes estimating an external force applied to the target object gripped by the grip portion based on the slip detected in the slip detection step, and controlling the gripping force based on the estimated external force.

REFERENCE SIGNS LIST

1 ROBOT APPARATUS
10 GRIPPING FORCE CONTROL UNIT
11 ROBOT HAND
12 WRIST PORTION
13a, 13b FINGER PORTION
14 ELASTIC BODY
15 TACTILE SENSOR
20 OVERALL CONTROL UNIT
30 PLANT
31 VARIOUS SENSORS
32 IMAGE SENSOR
33 IMAGE PROCESSING UNIT
100 GRIPPING FORCE GENERATION UNIT
101 REFERENCE FORCE GENERATION UNIT
102 ADDER-SUBTRACTOR
103 DRIVE CONTROL UNIT
104 CALCULATION UNIT
105 SUBTRACTOR
110 ACCELERATION SENSOR
300 OBJECT
301 HAND
1000 CPU

The invention claimed is:

1. A control device comprising:
a slip detection unit configured to detect a slip of a target object gripped by a grip portion; and
a control unit configured to
control a gripping force with which the grip portion grips the target object based on the slip detected by the slip detection unit, and
estimate an external force applied to the target object gripped by the grip portion based on the slip detected by the slip detection unit,
wherein the control unit controls the gripping force based on the estimated external force
wherein the external force is estimated based on a transverse elastic coefficient and a longitudinal elastic coefficient of the grip portion, and
wherein the slip detection unit and the control unit are each implemented via at least one processor.

2. The control device according to claim 1,
wherein the slip detection unit is further configured to detect a shear displacement amount generated with respect to the grip portion as the slip, and
wherein the control unit estimates the external force based on the shear displacement amount.

3. The control device according to claim 1,
wherein the control unit is further configured to
estimate a moment applied to the target object gripped by the grip portion based on the slip detected by the slip detection unit, and
control the gripping force by further using the estimated moment.

4. The control device according to claim 3,
wherein the slip detection unit is further configured to detect a rotational displacement amount generated with respect to the grip portion as the slip, and wherein the control unit estimates the moment based on the rotational displacement amount.

5. The control device according to claim 1, wherein the grip portion includes:
   an elastic body configured to come into contact with the target object and generate a frictional force against the target object; and
   a sensor configured to detect a force generated in the elastic body according to the frictional force,
   wherein the slip detection unit detects the slip based on a detection output of the sensor.

6. The control device according to claim 5,
   wherein the sensor includes a pressure distribution sensor configured to detect a pressure distribution on a two-dimensional surface, and
   wherein the slip detection unit detects the slip based on movement of a center position of a pressure distribution detected by the pressure distribution sensor.

7. The control device according to claim 1,
   wherein the control unit controls the gripping force for transferring the target object gripped by the grip portion in a case where the slip detected by the slip detection unit is not a slip generated by disturbance, and is a slip in a direction different from a gravity direction.

8. The control device according to claim 7,
   wherein the control unit performs control to lower a gripping force for gripping the target object according to the slip detected by the slip detection unit.

9. The control device according to claim 8,
   wherein the control unit further performs control to lower the gripping force with which the grip portion grips the target object, and performs control to return the gripping force to a gripping force immediately before the control when the slip detection unit detects the slip of a threshold level or more.

10. The control device according to claim 1,
    wherein the control unit performs control of the gripping force based on visual information in a range including at least the grip portion and the slip detected by the slip detection unit.

11. The control device according to claim 10,
    wherein the control unit is further configured to predict a direction in which the grip portion transfers the target object based on the visual information, and
    wherein the control unit performs control of the gripping force according to the predicted direction.

12. The control device according to claim 1,
    wherein the control unit performs control of the gripping force by further using a detection result of a force detected at a holding portion that holds the grip portion.

13. A control method comprising:
    detecting, by a slip detection unit, a slip of a target object gripped by a grip portion; and
    controlling, by a control unit, a gripping force with which the grip portion grips the target object based on the slip detected in the slip detection step,
    wherein controlling the gripping force includes
       estimating an external force applied to the target object gripped by the grip portion based on the slip detected in the slip detection step, and
       controlling the gripping force based on the estimated external force, and
    wherein the external force is estimated based on a transverse elastic coefficient and a longitudinal elastic coefficient of the grip portion.

14. A non-transitory computer-readable storage medium having embodied thereon a control program, which when executed by a processor of a computer causes the processor to execute a method, the method comprising:
    detecting a slip of a target object gripped by a grip portion; and
    controlling a gripping force with which the grip portion grips the target object based on the slip detected in the slip detection step,
    wherein controlling the gripping force includes
       estimating an external force applied to the target object gripped by the grip portion based on the slip detected in the slip detection step, and
       controlling the gripping force based on the estimated external force, and
    wherein the external force is estimated based on a transverse elastic coefficient and a longitudinal elastic coefficient of the grip portion.

* * * * *